US011777359B2

(12) United States Patent
Fujii

(10) Patent No.: US 11,777,359 B2
(45) Date of Patent: Oct. 3, 2023

(54) ELECTRIC WORK MACHINE

(71) Applicant: MAKITA CORPORATION, Anjo (JP)

(72) Inventor: Fuminari Fujii, Anjo (JP)

(73) Assignee: MAKITA CORPORATION, Anjo (JP)

( * ) Notice: Subject to any disclaimer, the term of this patent is extended or adjusted under 35 U.S.C. 154(b) by 224 days.

(21) Appl. No.: 17/342,232

(22) Filed: Jun. 8, 2021

(65) Prior Publication Data

US 2022/0006347 A1  Jan. 6, 2022

(30) Foreign Application Priority Data

Jul. 2, 2020  (JP) .................. 2020-114929

(51) Int. Cl.
*H02K 5/04* (2006.01)
*H02K 3/52* (2006.01)
*H02K 7/14* (2006.01)
*H02K 9/06* (2006.01)
*H02K 21/16* (2006.01)
*B25F 5/00* (2006.01)

(52) U.S. Cl.
CPC .............. *H02K 3/522* (2013.01); *H02K 5/04* (2013.01); *H02K 7/145* (2013.01); *H02K 9/06* (2013.01); *H02K 21/16* (2013.01); *B25F 5/008* (2013.01); *H02K 2203/09* (2013.01); *H02K 2203/12* (2013.01)

(58) Field of Classification Search
CPC ........ H02K 1/276; H02K 21/16; H02K 1/146; H02K 3/325; H02K 3/18; H02K 5/04; H02K 3/522; H02K 7/145; H02K 9/06
See application file for complete search history.

(56) References Cited

U.S. PATENT DOCUMENTS

2015/0069864 A1* 3/2015 Nagahama ............... H02K 5/04
                                                                    310/50
2020/0321823 A1* 10/2020 Park ..................... H02K 5/1732
2021/0175767 A1* 6/2021 Lee ........................ H02K 3/522

FOREIGN PATENT DOCUMENTS

JP           6234128 B2    11/2017

* cited by examiner

*Primary Examiner* — Leda T Pham
(74) *Attorney, Agent, or Firm* — Oliff PLC

(57) ABSTRACT

An electric work machine includes a smaller motor. An electric work machine includes a motor and a housing accommodating the motor. The motor includes a stator and a rotor rotatable about a rotation axis. The stator includes a stator core, an insulator fixed to the stator core, a plurality of coils fixed to the insulator, and a terminal connected to each of the plurality of coils. The housing includes at least one first tab in contact with at least a part of a surface of the stator. The at least one first tab is at the same position as at least a part of the terminal in an axial direction parallel to the rotation axis.

19 Claims, 26 Drawing Sheets

ELECTRIC WORK MACHINE

CROSS-REFERENCE TO RELATED APPLICATIONS

This application claims the benefit of priority to Japanese Patent Application No. 2020-114929, filed on Jul. 2, 2020, the entire contents of which are hereby incorporated by reference.

BACKGROUND

1. Technical Field

The present disclosure relates to an electric work machine.

2. Description of the Background

In the technical field of electric work machines, a known power tool includes a motor and a housing accommodating the motor as described in, for example, Japanese Patent No. 6234128.

BRIEF SUMMARY

Electric work machines are designed to include smaller motors. A large electric work machine including a large motor may be difficult to handle by an operator.

One or more aspects of the present disclosure are directed to an electric work machine including a smaller motor.

A first aspect of the present disclosure provides an electric work machine, including:
a motor including
a stator including
a stator core,
an insulator fixed to the stator core,
a plurality of coils fixed to the insulator, and
a terminal connected to at least one of the plurality of coils, and
a rotor rotatable about a rotation axis; and
a housing accommodating the motor, the housing including at least one first tab in contact with at least a part of a surface of the stator, the at least one first tab being at the same position as at least a part of the terminal in an axial direction parallel to the rotation axis.

A second aspect of the present disclosure provides an electric work machine, including:
a motor including
a stator including
a stator core,
an insulator fixed to the stator core, the insulator including a coil stopper protruding in an axial direction from an end face of the stator core, and
a plurality of coils fixed to the insulator, the coil stopper being radially outward from the plurality of coils, and
a rotor rotatable about a rotation axis; and
a housing accommodating the motor, the housing including a second tab in contact with at least a part of a surface of the stator, the second tab being at the same position as at least a part of the coil stopper in the axial direction parallel to the rotation axis.

A third aspect of the present disclosure provides an electric work machine, including:
a motor including
a stator including
a stator core,
an insulator fixed to the stator core,
a plurality of coils fixed to the insulator, and
an axially-facing surface on a surface of the stator and facing in an axial direction, the axially-facing surface including
a first axially-facing surface facing in a first axial direction, and
a second axially-facing surface facing in a second axial direction, and
a rotor rotatable about a rotation axis; and
a housing accommodating the motor, the housing including
at least one first tab having a first support surface in contact with the first axially-facing surface, and
at least one second tab at a position different from the at least one first tab in the axial direction parallel to the rotation axis, the at least one second tab having a second support surface in contact with the second axially-facing surface.

The electric work machine according to the above aspects of the present disclosure includes a smaller motor.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or upward and downward). The terms indicate relative positions or directions with respect to the center of an electric work machine.

An electric work machine includes a motor. In the embodiments, a direction parallel to a rotation axis AX of the motor is referred to as an axial direction for convenience. A direction radial from the rotation axis AX of the motor is referred to as a radial direction or radially for convenience. A direction about the rotation axis AX of the motor is referred to as a circumferential direction, circumferentially, or a rotation direction for convenience.

A position nearer the rotation axis AX of the motor in the radial direction, or a radial direction toward the rotation axis AX, is referred to as radially inward for convenience. A position farther from the rotation axis AX of the motor in the radial direction, or a radial direction away from the rotation axis AX, is referred to as radially outward for convenience. A position in one circumferential direction, or one circumferential direction, is referred to as a first circumferential direction for convenience. A position in the other circumferential direction, or the other circumferential direction, is referred to as a second circumferential direction for convenience.

First Embodiment

Electric Work Machine

Figure 1:
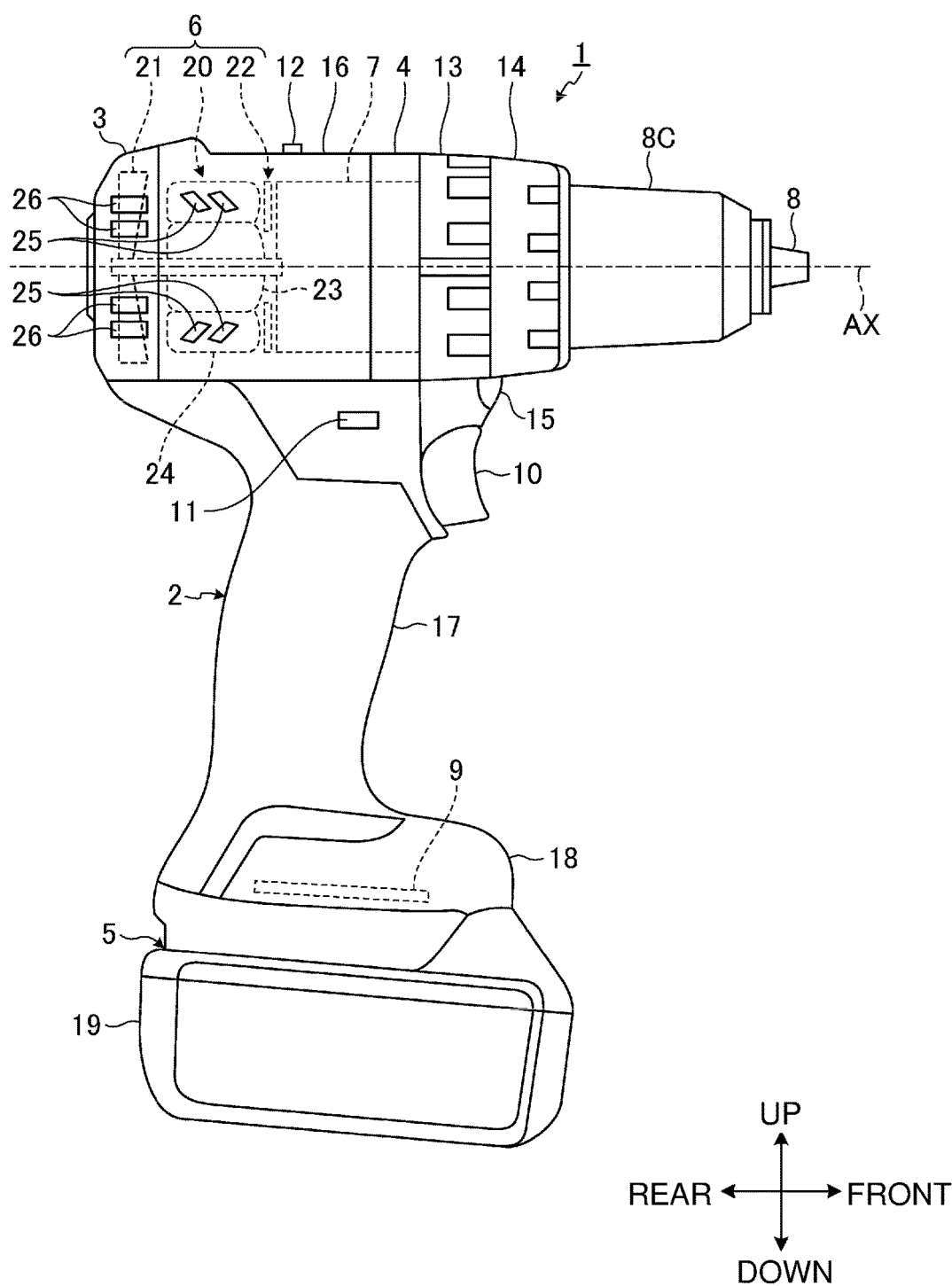
FIG. 1 is a side view of an electric work machine according to an embodiment.

FIG. 1 is a side view of an electric work machine 1 according to the present embodiment. The electric work machine 1 according to the present embodiment is a vibration driver drill, which is an example of a power tool. As shown in FIG. 1, the electric work machine 1 includes a housing 2, a rear cover 3, a gear case 4, a battery mount 5, a motor assembly 6, a power transmission 7, a spindle 8, a controller 9, a trigger switch 10, a forward-reverse switch lever 11, a speed switch lever 12, a mode change ring 13, a change ring 14, and a lamp 15.

The housing 2 includes a motor compartment 16, a grip 17, and a controller compartment 18. The housing 2 is formed from a synthetic resin.

The motor compartment 16 accommodates at least a part of the motor assembly 6. The motor compartment 16 is cylindrical.

The grip 17 is gripped by an operator of the electric work machine 1. The grip 17 protrudes downward from a lower portion of the motor compartment 16.

The controller compartment 18 accommodates the controller 9. The controller compartment 18 is connected to the lower end of the grip 17. The controller compartment 18 has larger outer dimensions than the grip 17 in the front-rear and lateral directions.

The rear cover 3 is connected to the rear of the motor compartment 16 to cover a rear opening in the motor compartment 16. The rear cover 3 is formed from a synthetic resin.

The gear case 4 is connected to the front of the motor compartment 16. The gear case 4 accommodates at least a part of the power transmission 7. The gear case 4 is cylindrical. The gear case 4 is formed from a metal.

The battery mount 5 is located below the controller compartment 18. A battery pack 19 is attached to the battery mount 5 in a detachable manner. The battery pack 19 may be a secondary battery. The battery pack 19 in the present embodiment is a rechargeable lithium-ion battery. The battery pack 19 functions as a power supply for the electric work machine 1. The battery pack 19 is attached to the battery mount 5 to power the electric work machine 1.

The motor assembly 6 includes a motor 20, a fan 21, and a sensor unit 22. The motor 20 is a power source for the electric work machine 1. The motor 20 includes a rotor 23 and a stator 24. The rotor 23 rotates about a rotation axis AX. The fan 21 generates an airflow for cooling the motor 20. The fan 21 rotates with a rotational force generated by the motor 20. The sensor unit 22 detects rotation of the rotor 23. A detection signal from the sensor unit 22 is output to the controller 9.

The motor compartment 16 has inlets 25. The rear cover 3 has outlets 26. The outlets 26 are located rearward from the inlets 25. The inlets 25 connect the inside and the outside of the housing 2. The outlets 26 connect the inside and the outside of the housing 2. The inlets 25 are located on the right and the left of the motor compartment 16. The outlets 26 are located on the right and the left of the rear cover 3. As the fan 21 rotates, air outside the housing 2 flows into the internal space of the housing 2 through the inlets 25 and cools the motor 20. Air inside the housing 2 flows out of the housing 2 through the outlets 26.

The power transmission 7 transmits a rotational force generated by the motor 20 to the spindle 8. The power transmission 7 includes multiple gears.

The spindle 8 rotates about the rotation axis AX with a rotational force from the motor 20 transmitted from the power transmission 7. The spindle 8 has an insertion hole to receive a tip tool. A chuck unit 8C for holding a tip tool at least partially surrounds the spindle 8. The tip tool placed in the insertion hole in the spindle 8 is held by the chuck unit 8C.

The controller 9 controls the motor 20. The controller 9 controls a driving current supplied from the battery pack 19 to the motor 20 in response to a detection signal from the sensor unit 22. The controller 9 is accommodated in the controller compartment 18. The controller 9 includes a circuit board on which multiple electronic components are mounted. Examples of the electronic components mounted on the board include a processor such as a central processing unit (CPU), a nonvolatile memory such as a read-only memory (ROM) or a storage device, a volatile memory such as a random-access memory (RAM), a field-effect transistor (FET), and a resistor.

The trigger switch 10 is operable by the operator to drive the motor 20. The trigger switch 10 is located on an upper portion of the grip 17. The trigger switch 10 protrudes frontward from the upper front of the grip 17. The trigger switch 10 is operable by the operator to move rearward. The operator moves the trigger switch 10 rearward with, for example, a forefinger. This causes the trigger switch 10 to generate an operation signal. The operation signal from the trigger switch 10 is input into the controller 9. The controller 9 drives the motor 20 in response to the operation signal from the trigger switch 10. When the trigger switch 10 stops being operated, the motor 20 is stopped. The operator stops the motor 20 by stopping rearward movement of the trigger switch 10 performed with, for example, a forefinger.

The forward-reverse switch lever 11 is operable to switch the rotation direction of the motor 20 between forward and reverse. The forward-reverse switch lever 11 is located between the lower end of the motor compartment 16 and the upper end of the grip 17. The forward-reverse switch lever 11 is operable by the operator to move left or right. This operation switches the rotation direction of the motor 20, thus switching the rotation direction of the spindle 8.

The speed switch lever 12 is operable to switch the rotational speed of the spindle 8 between a first speed and a second speed. The speed switch lever 12 is located in an upper portion of the motor compartment 16. The speed switch lever 12 is moved frontward or rearward. This operation switches the rotational speed of the motor 20.

The mode change ring 13 changes the operation mode of the electric work machine 1. The mode change ring 13 is located frontward from the gear case 4. The mode change ring 13 is rotatable by the operator. The operation mode of the electric work machine 1 includes a vibration mode and a non-vibration mode. In the vibration mode, the spindle 8 vibrates in the axial direction. In the non-vibration mode, the spindle 8 does not vibrate in the axial direction. The non-vibration mode includes a drill mode and a clutch mode. In the drill mode, power transmission to the spindle 8 is enabled independently of a rotation load on the spindle 8. In the clutch mode, power transmission to the spindle 8 is disabled depending on a rotation load on the spindle 8.

The change ring 14 is operable to set a release value for disabling power transmission to the spindle 8. The change ring 14 is located frontward from the mode change ring 13. The change ring 14 is rotatable by the operator. The release value indicates a rotation load on the spindle 8. When the rotation load on the spindle 8 reaches the release value, the power transmission to the spindle 8 is disabled.

The lamp 15 emits illumination light to illuminate ahead of the electric work machine 1. The lamp 15 includes light-emitting diodes (LEDs). The lamp 15 is located at the upper front of the grip 17.

Motor Assembly

Figure 2:
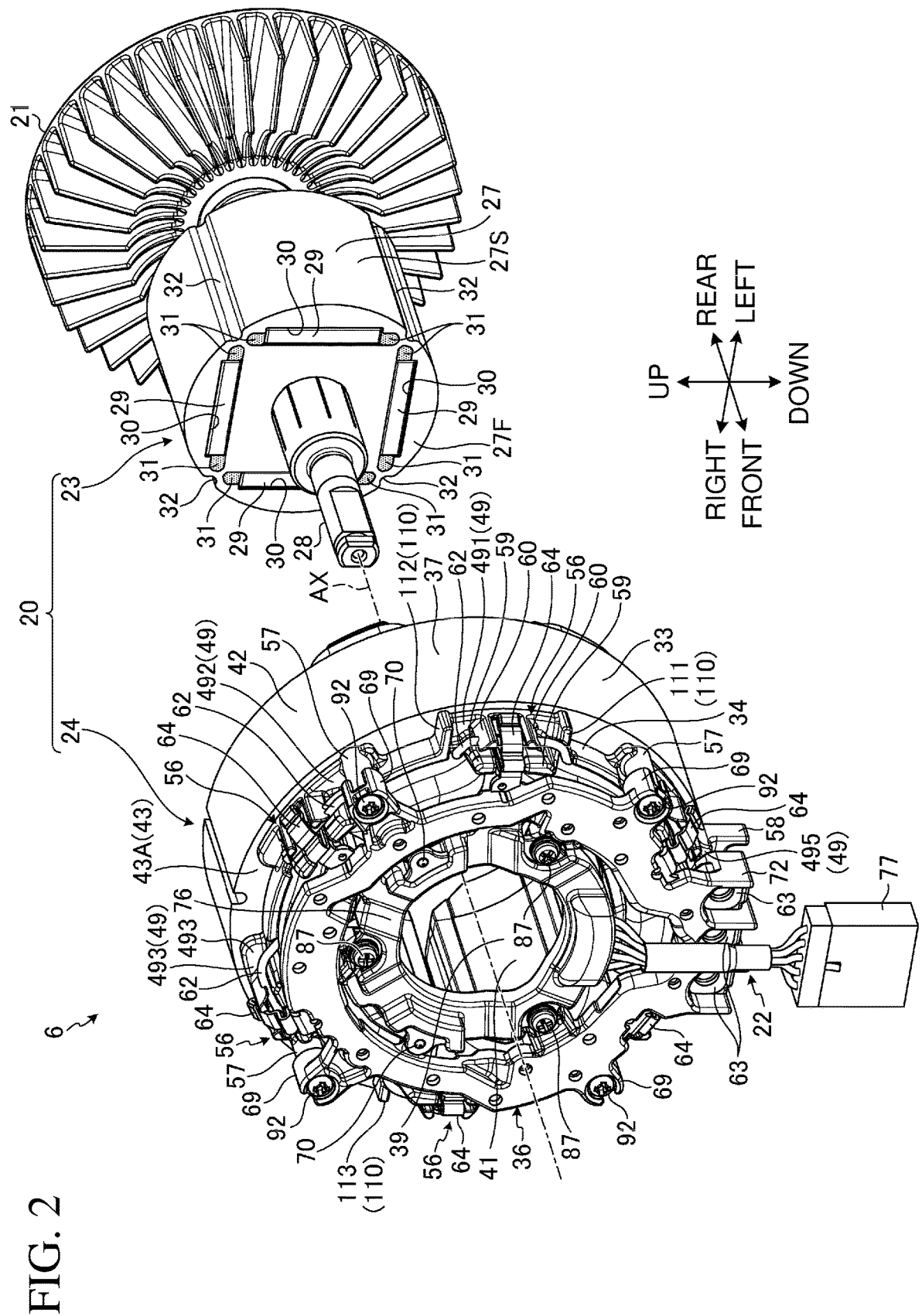
FIG. 2 is an exploded front perspective view of a motor assembly in the embodiment.
Figure 3:
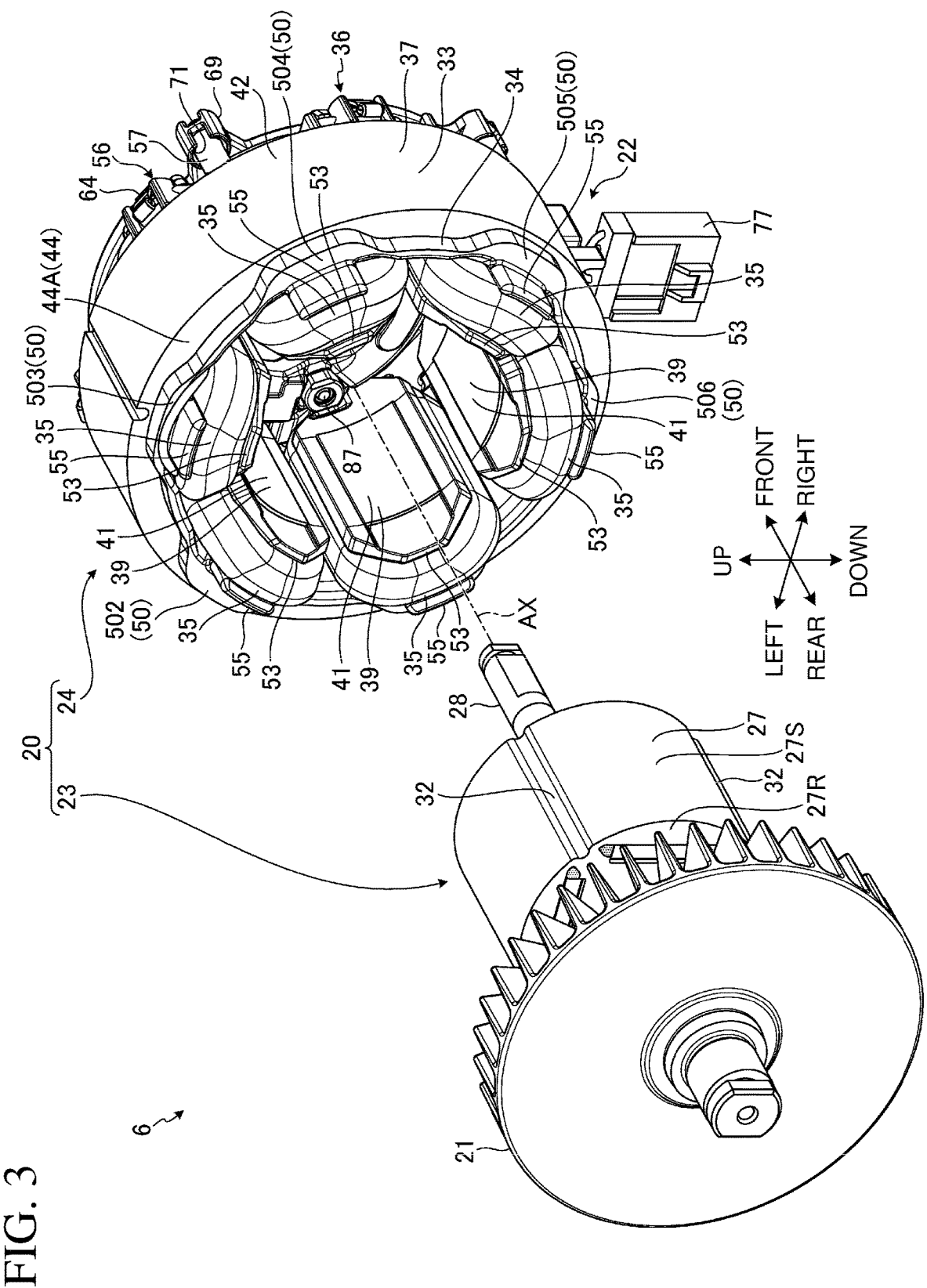
FIG. 3 is an exploded rear perspective view of the motor assembly in the embodiment.

FIG. 2 is an exploded front perspective view of the motor assembly 6 in the present embodiment. FIG. 3 is an exploded rear perspective view of the motor assembly 6 in the present embodiment. The motor assembly 6 includes the motor 20, the fan 21, and the sensor unit 22.

In the present embodiment, the rotation axis AX of the motor 20 extends in the front-rear direction. The axial direction and the front-rear direction are parallel to each other. Hereafter, a first axial direction is referred to as the front and a second axial direction opposite to the first axial direction is referred to as the rear for convenience.

Motor

The motor 20 is driven by power supplied from the battery pack 19. The motor 20 generates a rotational force for rotating the spindle 8.

The motor 20 includes the rotor 23 and the stator 24. The rotor 23 rotates relative to the stator 24. The motor 20 in the present embodiment is a brushless inner-rotor motor. The stator 24 surrounds the rotor 23. The rotor 23 rotates about the rotation axis AX.

The rotor 23 includes a rotor core 27, a rotor shaft 28, and permanent magnets 29.

The rotor core 27 includes multiple steel plates stacked on one another. The steel plates are iron-based metal plates. The rotor core 27 surrounds the rotation axis AX. The rotor core 27 includes an end face 27F facing frontward, an end face 27R facing rearward, and an outer surface 27S facing radially outward.

The rotor shaft 28 extends in the axial direction. The rotor shaft 28 is located inside the rotor core 27. The rotor core 27 and the rotor shaft 28 are fixed to each other. The rotor shaft 28 has a front portion protruding frontward from the end face 27F of the rotor core 27. The rotor shaft 28 has a rear portion protruding rearward from the end face 27R of the rotor core 27. The rotor shaft 28 has the front portion rotatably supported by a front bearing (not shown). The rotor shaft 28 has the rear portion rotatably supported by a rear bearing (not shown). The rotor shaft 28 has its front end connected to the power transmission 7.

The permanent magnets 29 are held by the rotor core 27. In the present embodiment, four permanent magnets 29 surround the rotation axis AX. The permanent magnets 29 are fixed to the rotor core 27. The permanent magnets 29 are, for example, neodymium-iron-boron magnets. The permanent magnets 29 are plates embedded in the rotor core 27.

The motor 20 is an interior permanent magnet (IPM) motor. The rotor core 27 has magnet slots 30 extending in the axial direction. The permanent magnets 29 are placed in the respective magnet slots 30. Each permanent magnet 29 has a gap between its outer surface and an inner surface of the magnet slot 30 that is filled with a resin 31.

The rotor core 27 has recesses 32 extending in the axial direction on the outer surface 27S. The recesses 32 have their front ends connected to the end face 27F of the rotor core 27, and rear ends connected to the end face 27R of the rotor core 27. The recesses 32 are located on the outer surface 27S of the rotor core 27. In the present embodiment, four recesses 32 surround the rotation axis AX. The recesses 32 are located at circumferentially equal intervals to reduce noise caused by rotation of the rotor core 27. The recesses 32 may be eliminated.

The fan 21 generates an airflow for cooling the motor 20. The fan 21 is located rearward from the stator 24 and the rotor core 27. The fan 21 is fastened to a rear portion of the rotor shaft 28. The fan 21 at least partially faces the end face 27R of the rotor core 27. The fan 21 rotates with a rotational force generated by the motor 20. As the rotor shaft 28 rotates, the fan 21 rotates together with the rotor shaft 28.

Figure 4:
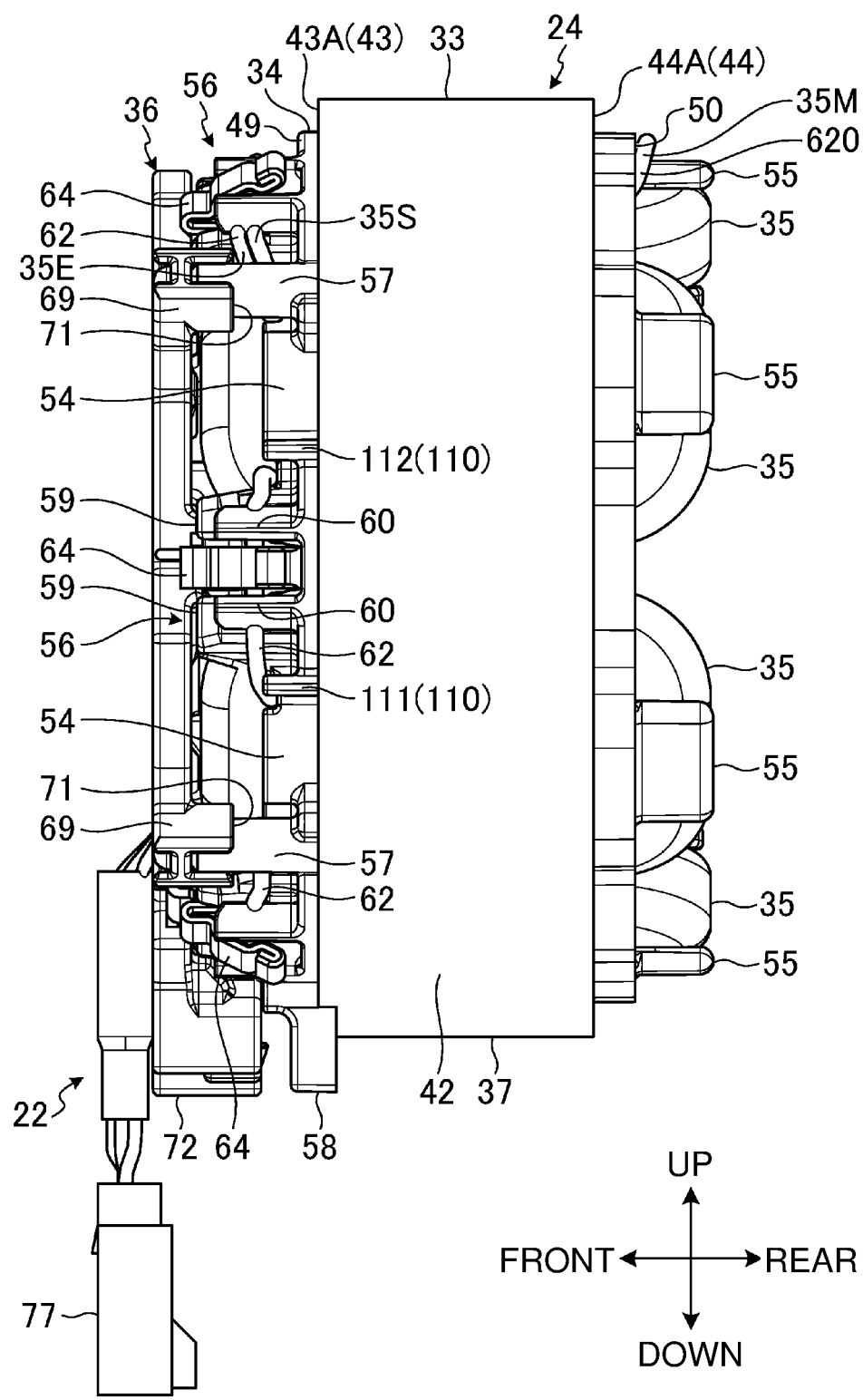
FIG. 4 is a left side view of a stator and a sensor unit in the embodiment.
Figure 5:
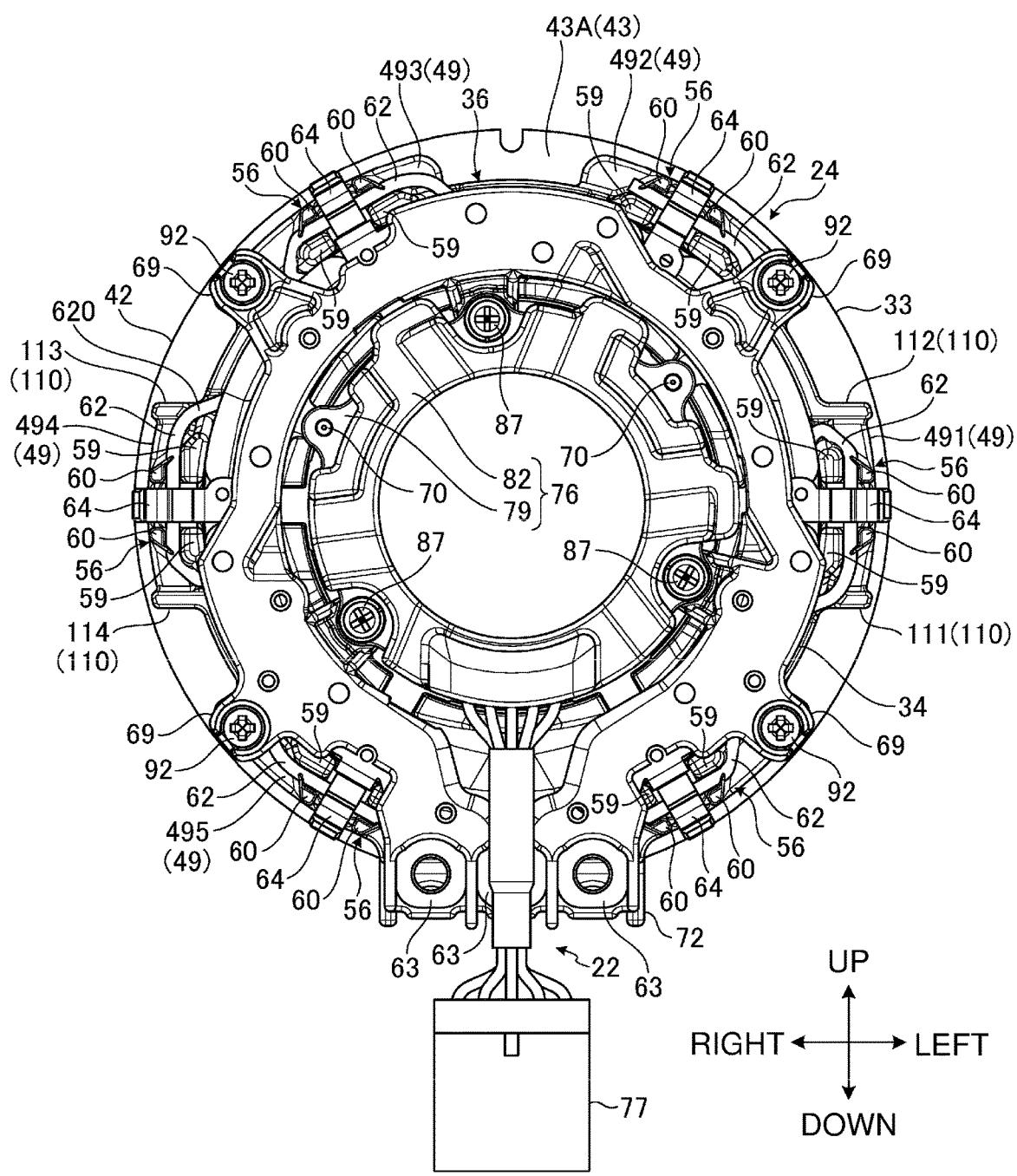
FIG. 5 is a front view of the stator and the sensor unit in the embodiment.
Figure 6:
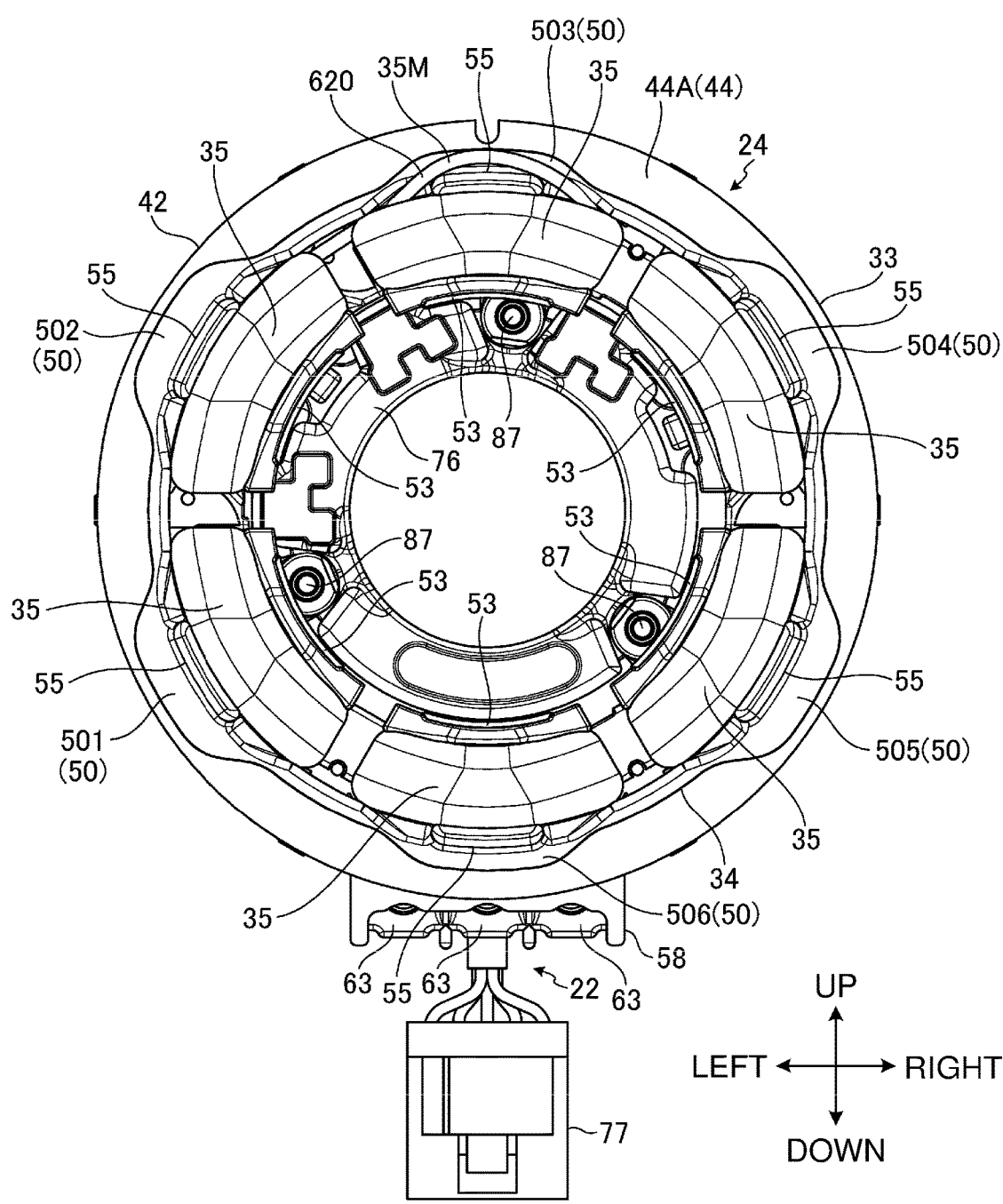
FIG. 6 is a rear view of the stator and the sensor unit in the embodiment.
Figure 7:
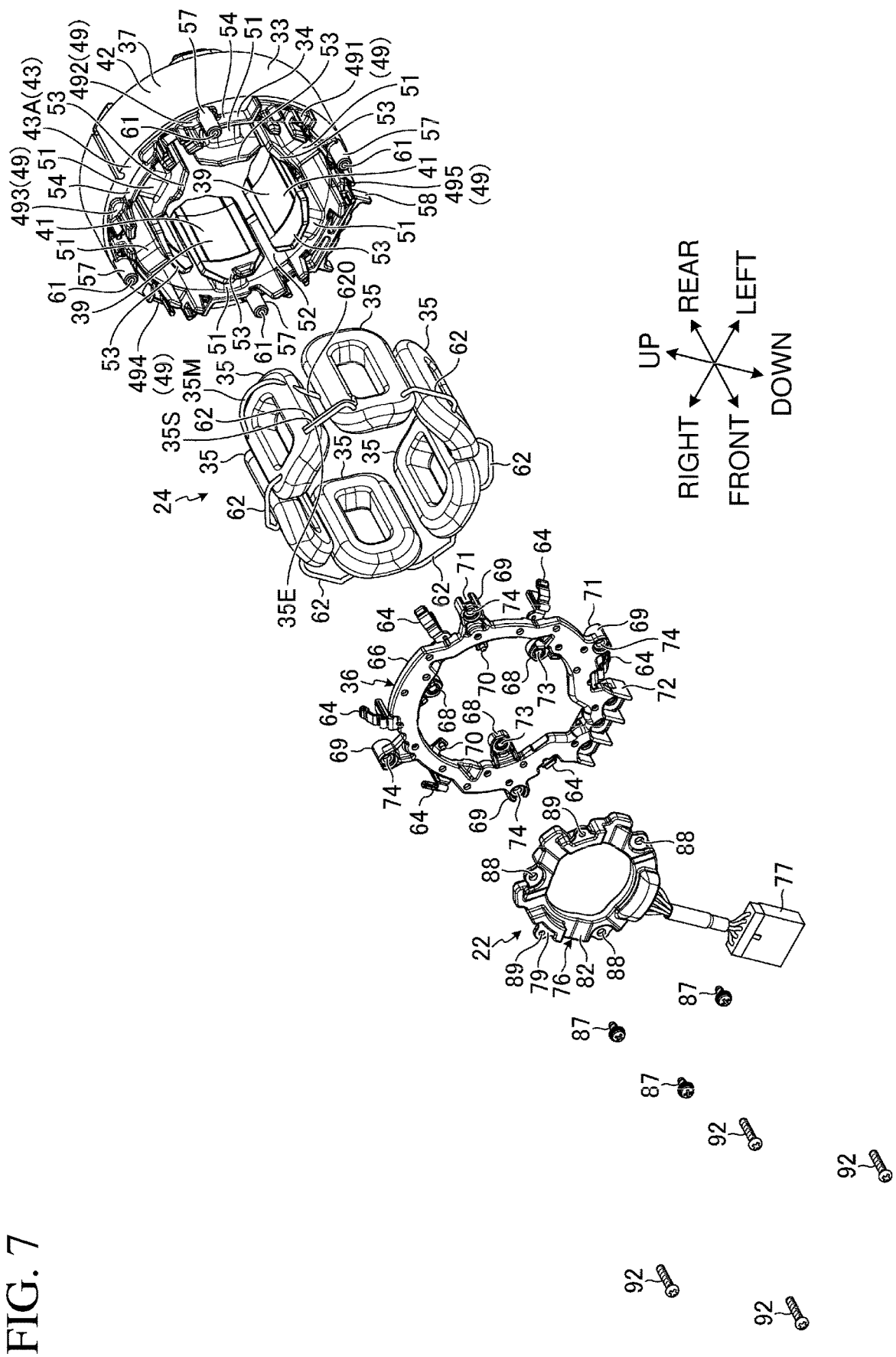
FIG. 7 is an exploded front perspective view of the stator and the sensor unit in the embodiment.
Figure 8:
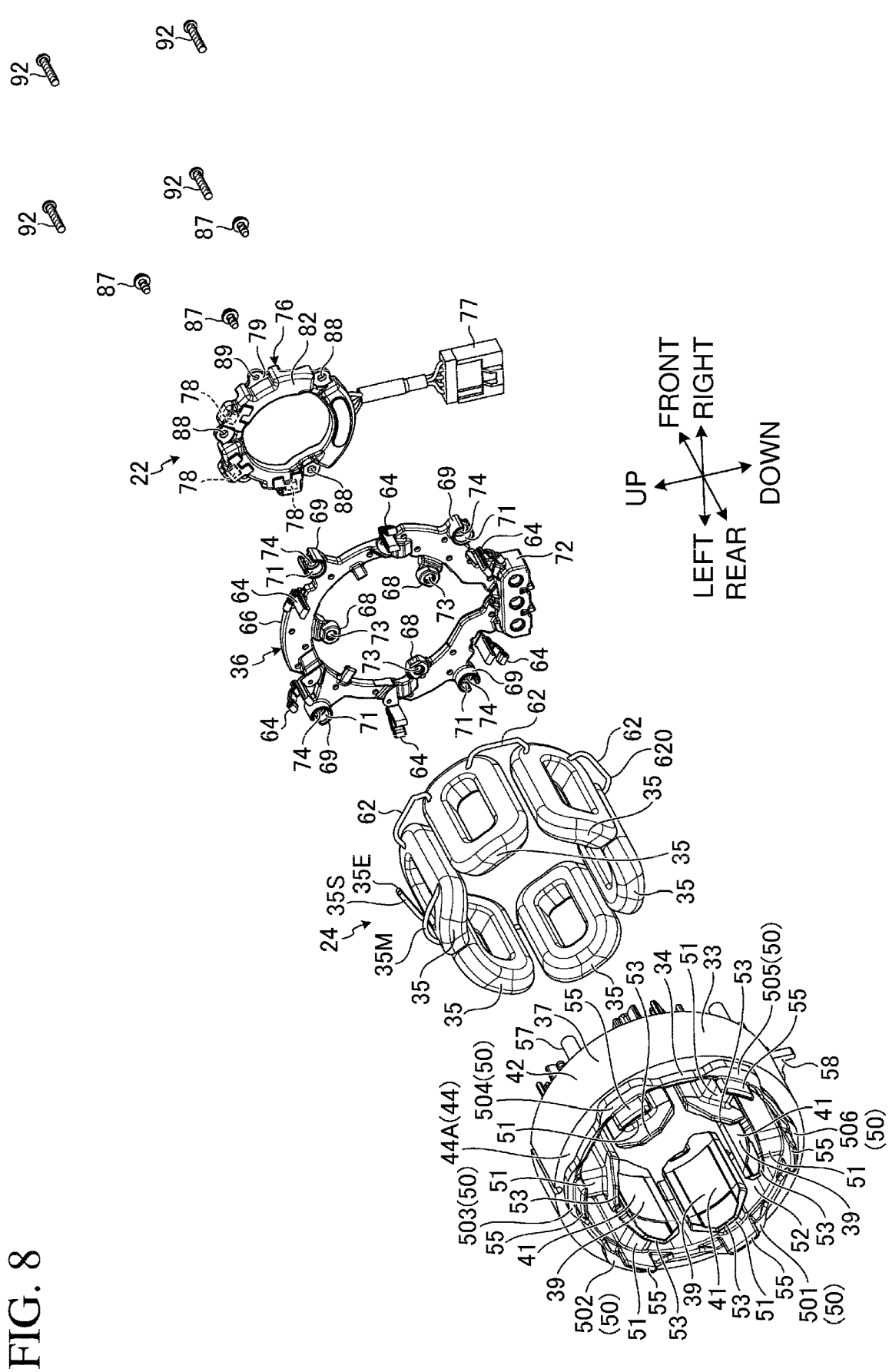
FIG. 8 is an exploded rear perspective view of the stator and the sensor unit in the embodiment.

FIG. 4 is a left side view of the stator 24 and the sensor unit 22 in the present embodiment. FIG. 5 is a front view of the stator 24 and the sensor unit 22 in the present embodiment. FIG. 6 is a rear view of the stator 24 and the sensor unit 22 in the present embodiment. FIG. 7 is an exploded front perspective view of the stator 24 and the sensor unit 22 in the present embodiment. FIG. 8 is an exploded rear perspective view of the stator 24 and the sensor unit 22 in the present embodiment.

As shown in FIGS. 2 to 8, the stator 24 includes a stator core 33, an insulator 34, coils 35, and a busbar unit 36.

The stator core 33 includes multiple steel plates stacked on one another. The steel plates are iron-based metal plates. The stator core 33 surrounds the rotor core 27. The insulator 34 is an electrical insulating member formed from a synthetic resin. The insulator 34 is fixed to the stator core 33. The insulator 34 is integral with the stator core 33. The insulator 34 is fixed to the stator core 33 by, for example, insert molding. The stator 24 includes the multiple (six in the present embodiment) coils 35. The coils 35 are fixed to the insulator 34. The busbar unit 36 is fixed to the insulator 34.

Figure 9:
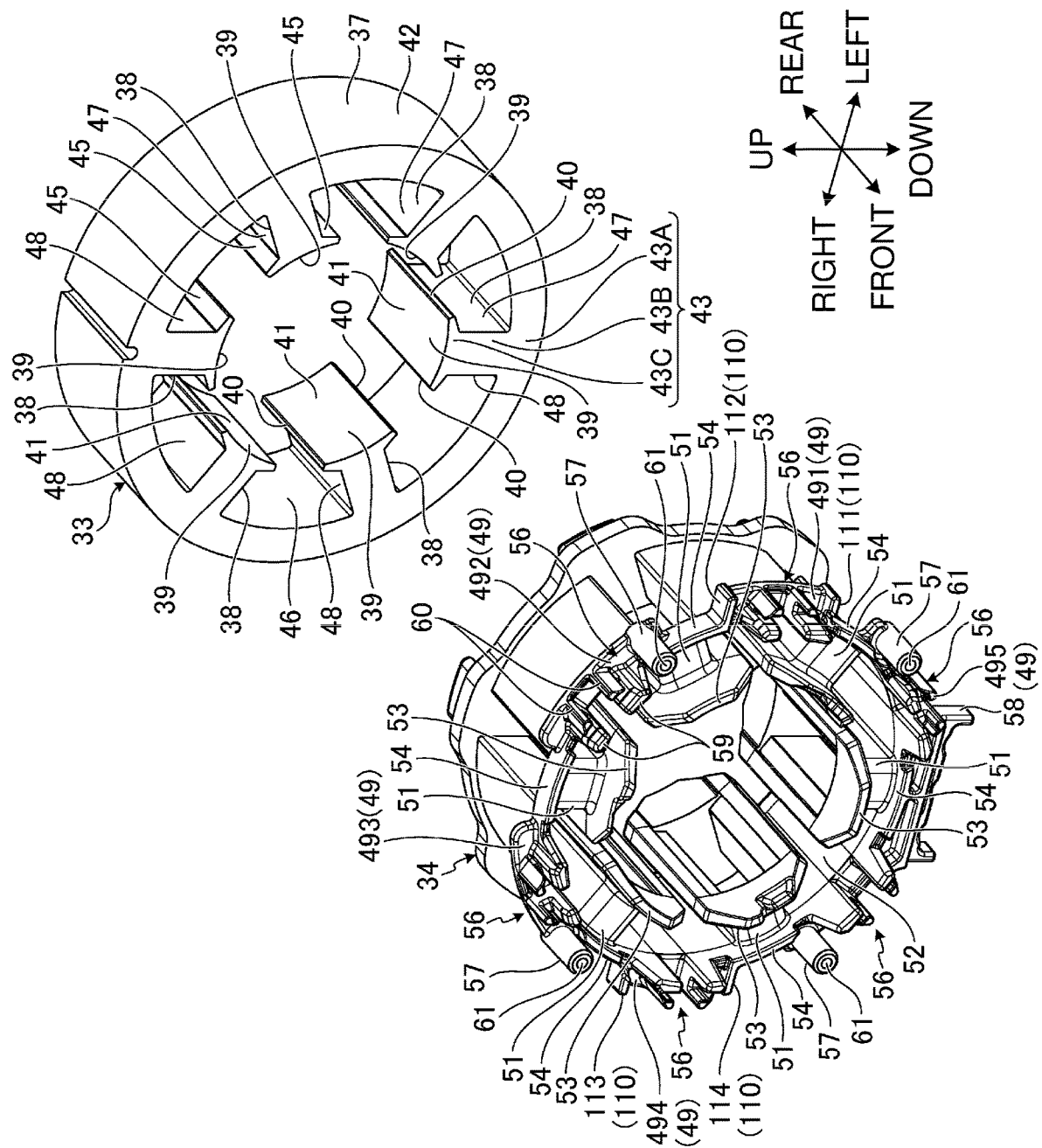
FIG. 9 is an exploded front perspective view of a stator core and an insulator in the embodiment.
Figure 10:
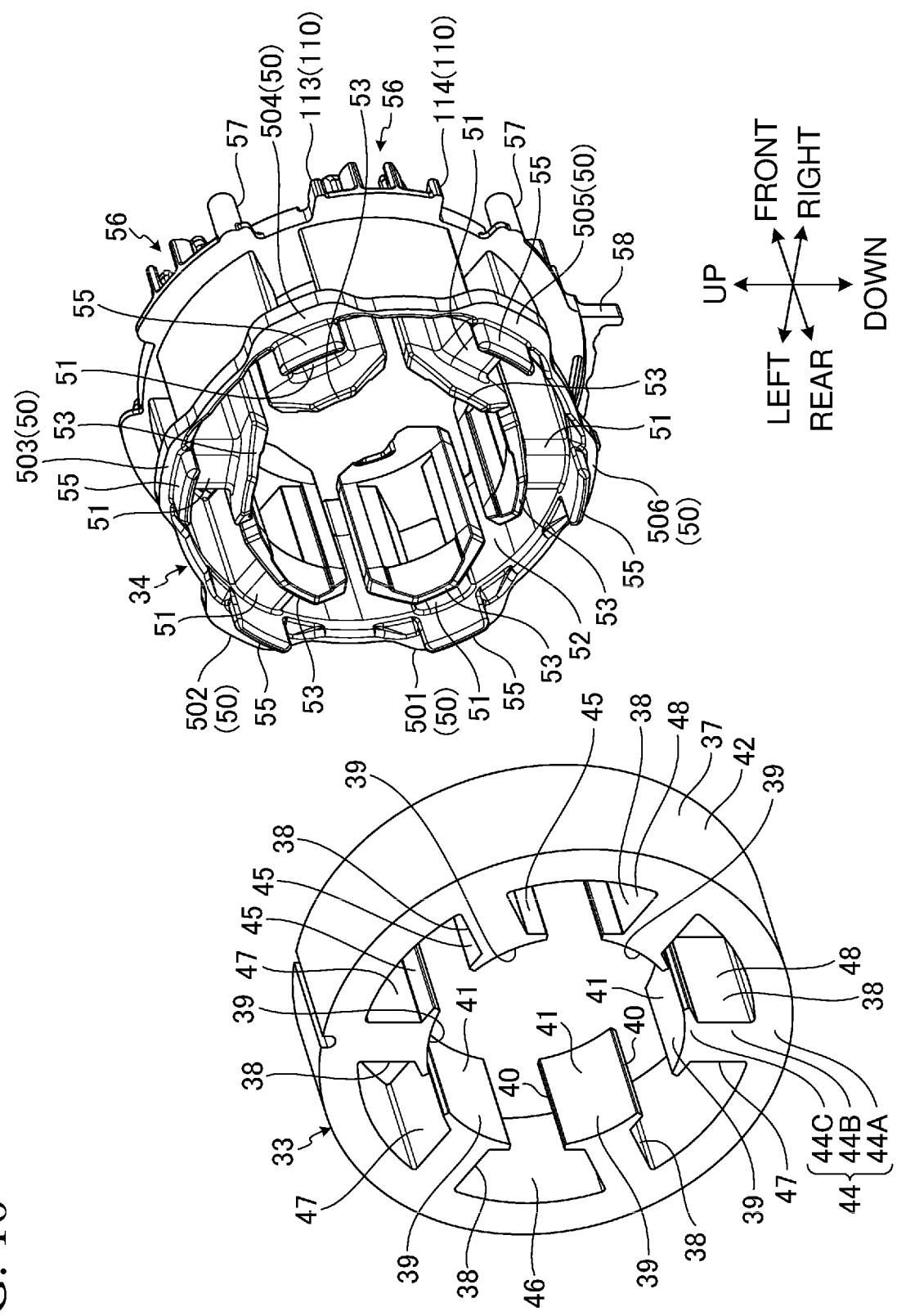
FIG. 10 is an exploded rear perspective view of the stator core and the insulator in the embodiment.

FIG. 9 is an exploded front perspective view of the stator core 33 and the insulator 34 in the present embodiment. FIG. 10 is an exploded rear perspective view of the stator core 33 and the insulator 34 in the present embodiment.

The stator core 33 includes an outer cylinder 37, teeth 38, and inner walls 39. The outer cylinder 37 surrounds the rotation axis AX. The teeth 38 protrude radially inward from the inner surface of the outer cylinder 37. The multiple (six in the present embodiment) teeth 38 are located circumferentially at intervals. Each inner wall 39 is connected to the radially inner end of the corresponding tooth 38. Each inner wall 39 is larger than the corresponding tooth 38 in the circumferential direction. Each tooth 38 has the center aligned with the center of the corresponding inner wall 39 in the circumferential direction. Each inner wall 39 has a protrusion 40 protruding from the inner end of the corresponding tooth 38 in the first circumferential direction and a protrusion 40 protruding in the second circumferential direction.

The surface of the stator core 33 includes inner surfaces 41, an outer surface 42, an end face 43, an end face 44, opposing surfaces 45, opposing surfaces 46, side surfaces 47, and side surfaces 48.

The inner surfaces 41 are on the inner walls 39 and face radially inward. The inner surfaces 41 face the rotor core 27. The inner surfaces 41 are arc-shaped in a plane orthogonal to the rotation axis AX.

The outer surface 42 is on the outer cylinder 37 and faces radially outward.

The end face 43 faces frontward. The end face 43 includes an end face 43A, end faces 43B and end faces 43C. The end face 43A is at the front of the outer cylinder 37. The end faces 43B are at the front of the teeth 38. The end faces 43C are at the front of the inner walls 39. The end face 43A on the outer cylinder 37, the end faces 43B on the teeth 38, and the end faces 43C on the inner walls 39 are in the same plane. The end face 43 is orthogonal to the rotation axis AX.

The end face 44 faces rearward. The end face 44 includes an end face 44A, end faces 44B, and end faces 44C. The end face 44A is at the rear of the outer cylinder 37. The end faces 44B are at the rear of the teeth 38. The end faces 44C are at the rear of the inner walls 39. The end face 44A on the outer cylinder 37, the end faces 44B on the teeth 38, and the end faces 44C on the inner walls 39 are in the same plane. The end face 44 is orthogonal to the rotation axis AX.

The opposing surfaces 45 are on the inner walls 39 and face radially outward.

The opposing surfaces 46 are on the outer cylinder 37 and face radially inward.

The side surfaces 47 are on the teeth 38 and face in the first circumferential direction.

The side surfaces 48 are on the teeth 38 and face in the second circumferential direction.

The insulator 34 covers at least a part of the surface of the stator core 33. The insulator 34 includes covers 49, covers 50, covers 51, and a cover 52. The covers 49 cover at least parts of the end face 43A at the front of the outer cylinder 37. The covers 50 cover at least parts of the end face 44A at the rear of the outer cylinder 37. The covers 51 cover the surfaces of the teeth 38. The surface of each tooth 38 includes the end face 43B, the end face 44B, the side surface 47, and the side surface 48. The coils 35 are wound around the teeth 38 with the covers 51 between them. The cover 52 covers the opposing surfaces 46 on the outer cylinder 37. The covers 49, the covers 50, the covers 51, and the cover 52 are integral with one another.

The covers 49 include cover areas 491, 492, 493, 494, and 495. The cover areas 491 to 495 are located circumferentially on the end face 43A on the outer cylinder 37 at intervals.

The cover area 491 is defined in a left portion of the end face 43A. The cover area 492 is defined in an upper left portion of the end face 43A. The cover area 493 is defined in an upper right portion of the end face 43A. The cover area 494 is defined in a right portion of the end face 43A. The cover area 495 is defined in a lower portion of the end face 43A. The cover area 495 is larger than each of the cover areas 491 to 494 in the circumferential direction.

The covers 50 include cover areas 501, 502, 503, 504, 505, and 506. The cover areas 501 to 506 are located circumferentially on the end face 44A on the outer cylinder 37 at intervals.

The cover area 501 is defined in a lower left portion of the end face 44A. The cover area 502 is defined in an upper left portion of the end face 44A. The cover area 503 is defined in an upper portion of the end face 44A. The cover area 504 is defined in an upper right portion of the end face 44A. The cover area 505 is defined in a lower right portion of the end face 44A. The cover area 506 is defined in a lower portion of the end face 44A. The cover areas 501 to 506 each have the same dimension in the circumferential direction.

The insulator 34 includes coil stoppers 53, coil stoppers 54, coil stoppers 55, wire supports 56, screw bosses 57, a joint 58, and ribs 110.

Each coil stopper 53 is connected to the radially inner end of the corresponding cover 51. With the coils 35 wound around the respective covers 51, the coil stoppers 53 are radially inward from the coils 35.

Each coil stopper 53 surrounds the corresponding inner wall 39. Each coil stopper 53 is larger than the corresponding cover 51 in the axial direction. Each coil stopper 53 is larger than the corresponding cover 51 in the circumferential direction.

Each coil stopper 53 is connected to the radially outer end of the corresponding cover 51. Each coil stopper 53 protrudes frontward and rearward from the cover 51. Each coil stopper 53 protrudes in the first and second circumferential directions from the cover 51. Each coil stopper 53 at least partially protrudes frontward from the end face 43 of the stator core 33. Each coil stopper 53 at least partially protrudes rearward from the end face 44 of the stator core 33.

Each coil stopper 54 is connected to the radially outer end of the corresponding cover 51. Each coil stopper 54 protrudes frontward from the end face 43 of the stator core 33. In the axial direction, the distance between the end face 43 and the front end of each coil stopper 54 is smaller than the distance between the end face 43 and the front end of each coil stopper 53. In other words, each coil stopper 54 protrudes from the end face 43 by a smaller degree than each coil stopper 53.

Each coil stopper 55 is connected to the radially outer end of the corresponding cover 51. Each coil stopper 55 protrudes rearward from the end face 44 of the stator core 33. In the axial direction, the distance between the end face 43 and the rear end of each coil stopper 55 is larger than the distance between the end face 43 and the rear end of each coil stopper 53. In other words, each coil stopper 55 protrudes from the end face 43 by a greater degree than each coil stopper 53.

The wire supports 56 are located on the covers 49 in a one-to-one correspondence with the coils 35. The wire supports 56 are radially outward from the coils 35. Each wire support 56 includes a pair of protrusions 59 and a pair of protrusions 60. Each pair of protrusions 59 protrude frontward from the corresponding cover 49. Each pair of protrusions 60 protrude frontward from the corresponding cover 49. Each pair of protrusions 59 are located circumferentially. Each pair of protrusions 60 are located circumferentially. The protrusions 60 are radially outward from the protrusions 59. In the axial direction, the distance between the end face 43 and the front end of each protrusion 59 is larger than the distance between the end face 43 and the front end of each protrusion 60. In other words, each protrusion 59 protrudes from the end face 43 by a greater degree than each protrusion 60.

A single wire support 56 is located on each of the cover areas 491 to 494. Two wire supports 56 are located on the cover area 495.

The screw bosses 57 are located on the covers 49. Each screw boss 57 protrudes frontward from the corresponding cover 49. The multiple (four in the present embodiment) screw bosses 57 are located at intervals around the rotation axis AX. A single screw boss 57 is located on each of the cover area 492 and the cover area 493. Two screw bosses 57 are located on the cover area 495. Each screw boss 57 has a screw hole 61.

Each rib 110 is located on a part of the corresponding cover 49. Each rib 110 protrudes frontward from a surface of the corresponding cover 49. In the present embodiment, each of the cover area 491 and the cover area 494 includes one or more ribs 110 that extend laterally. The ribs 110 on the cover area 491 are located on both circumferential ends of the wire support 56. The ribs 110 on the cover area 494 are located on both circumferential ends of the wire support 56.

The ribs 110 in the present embodiment include a rib 111, a rib 112, a rib 113, and a rib 114. The ribs 111 and 112 are located on the cover area 491. The ribs 113 and 114 are located on the cover area 494.

The rib 111 on the cover area 491 is downward from the wire support 56. The rib 112 on the cover area 491 is upward from the wire support 56. The rib 113 on the cover area 494 is upward from the wire support 56. The rib 114 on the cover area 494 is downward from the wire support 56.

The joint 58 protrudes radially outward from the cover area 495 covering a lower portion of the end face 43A.

Figure 11:
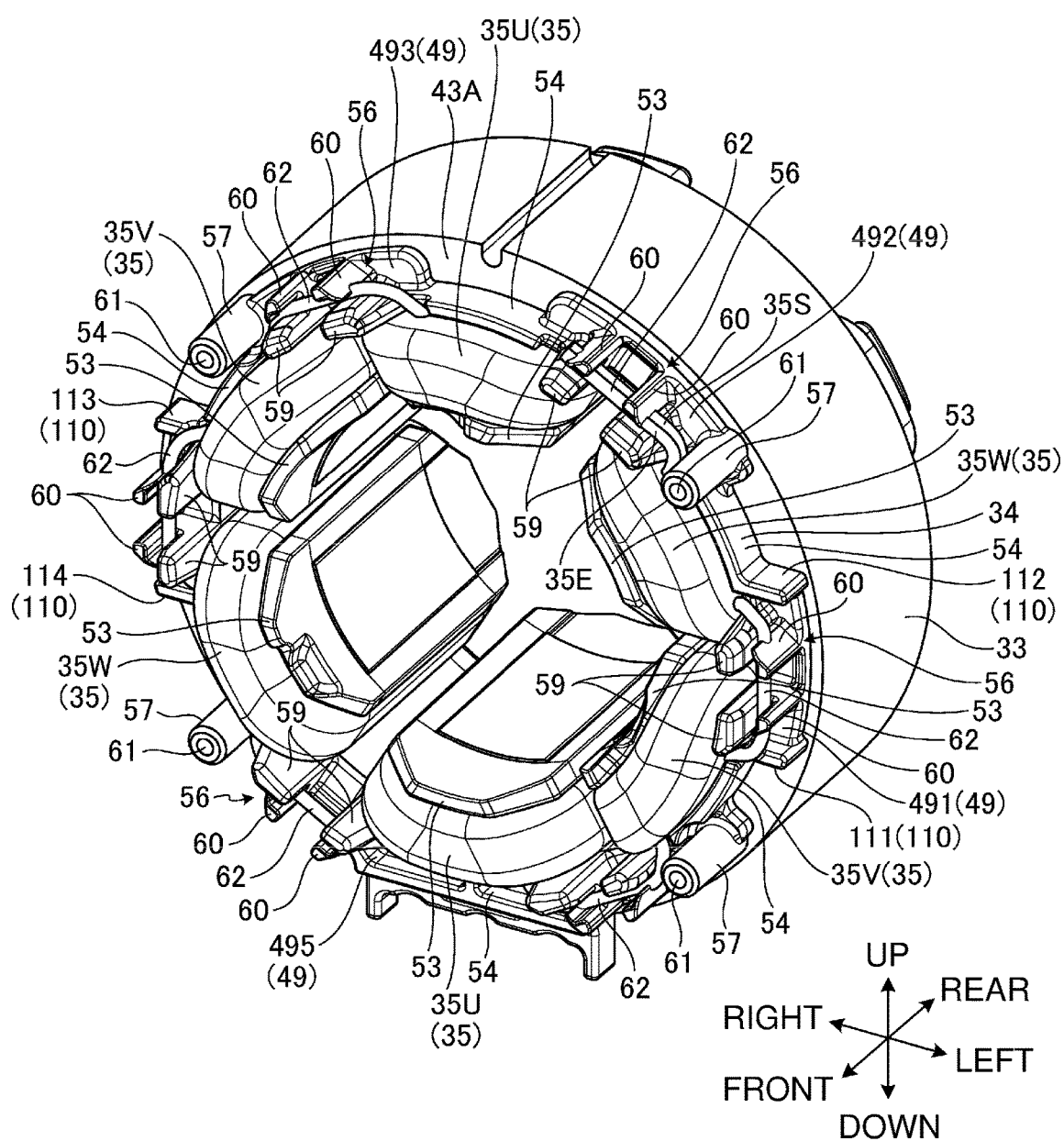
FIG. 11 is a front perspective view of coils fixed to the insulator in the embodiment.
Figure 12:
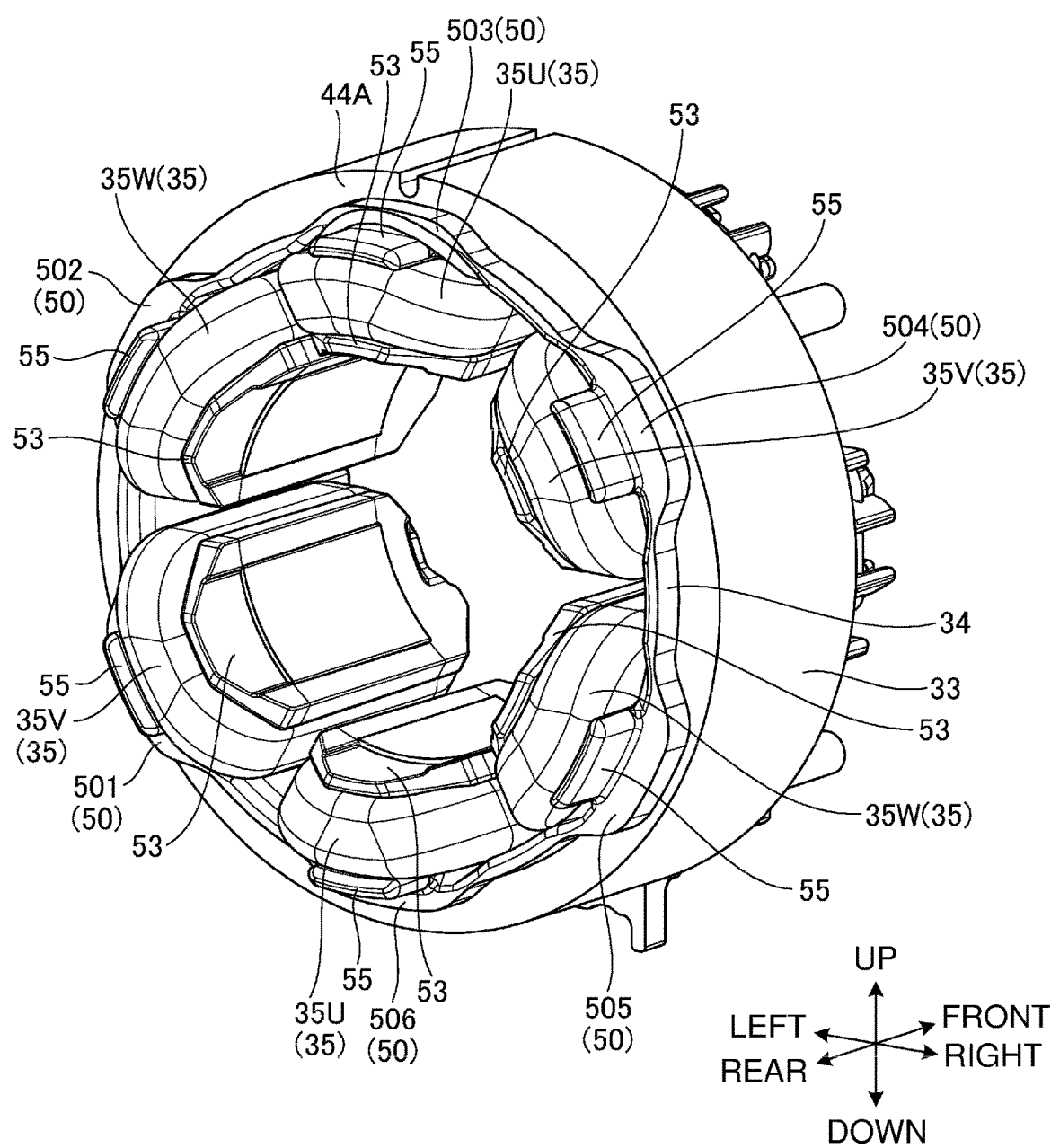
FIG. 12 is a rear perspective view of the coils fixed to the insulator in the embodiment.

FIG. 11 is a front perspective view of the coils 35 fixed to the insulator 34 in the present embodiment. FIG. 12 is a rear perspective view of the coils 35 fixed to the insulator 34 in the present embodiment.

The multiple (six in the present embodiment) coils 35 are wound around the stator core 33 with the insulator 34 in between. Each coil 35 surrounds the corresponding cover 51. Each coil 35 is wound around each of the teeth 38 with the corresponding cover 51 between them.

With the coils 35 wound around the respective covers 51, the coil stoppers 53 are radially inward from the coils 35.

With the coils 35 wound around the respective covers 51, the coil stoppers 54 are radially outward from the coils 35.

With the coils 35 wound around the respective covers 51, the coil stoppers 55 are radially outward from the coils 35.

In the radial direction, a part of each coil 35 is located between the corresponding coil stoppers 53 and 54. In the radial direction, another part of each coil 35 is located between the corresponding coil stoppers 53 and 55. The multiple coils 35 are fixed to the insulator 34. The coils 35 and the stator core 33 are insulated from each other by the insulator 34.

The multiple coils 35 are formed by winding a single wire 620. Each coil 35 is connected to a circumferentially adjacent coil 35 with a connection wire 62, which is a part of the wire 620. Each connection wire 62 is a part of the wire 620 between two adjacent coils 35. In the axial direction, each connection wire 62 is located between the center of the corresponding coil 35 and the front end of the coil 35.

Each connection wire 62 is supported by the corresponding wire support 56 in the insulator 34. The connection wires 62 in the present embodiment are located between the protrusions 59 and the protrusions 60 in the radial direction.

As shown in FIGS. 4 and 6, the wire 620 has a middle portion 35M radially outward from the coil stopper 55. As shown in FIGS. 7 and 8, the middle portion 35M protrudes radially outward from one coil 35. The middle portion 35M is radially outward from the connection wires 62. In the axial direction, the middle portion 35M is located between the center of the coil 35 and the rear end of the coil 35. The middle portion 35M radially outward from the coil stopper 55 improves the cooling capability of the coils 35.

Figure 13:
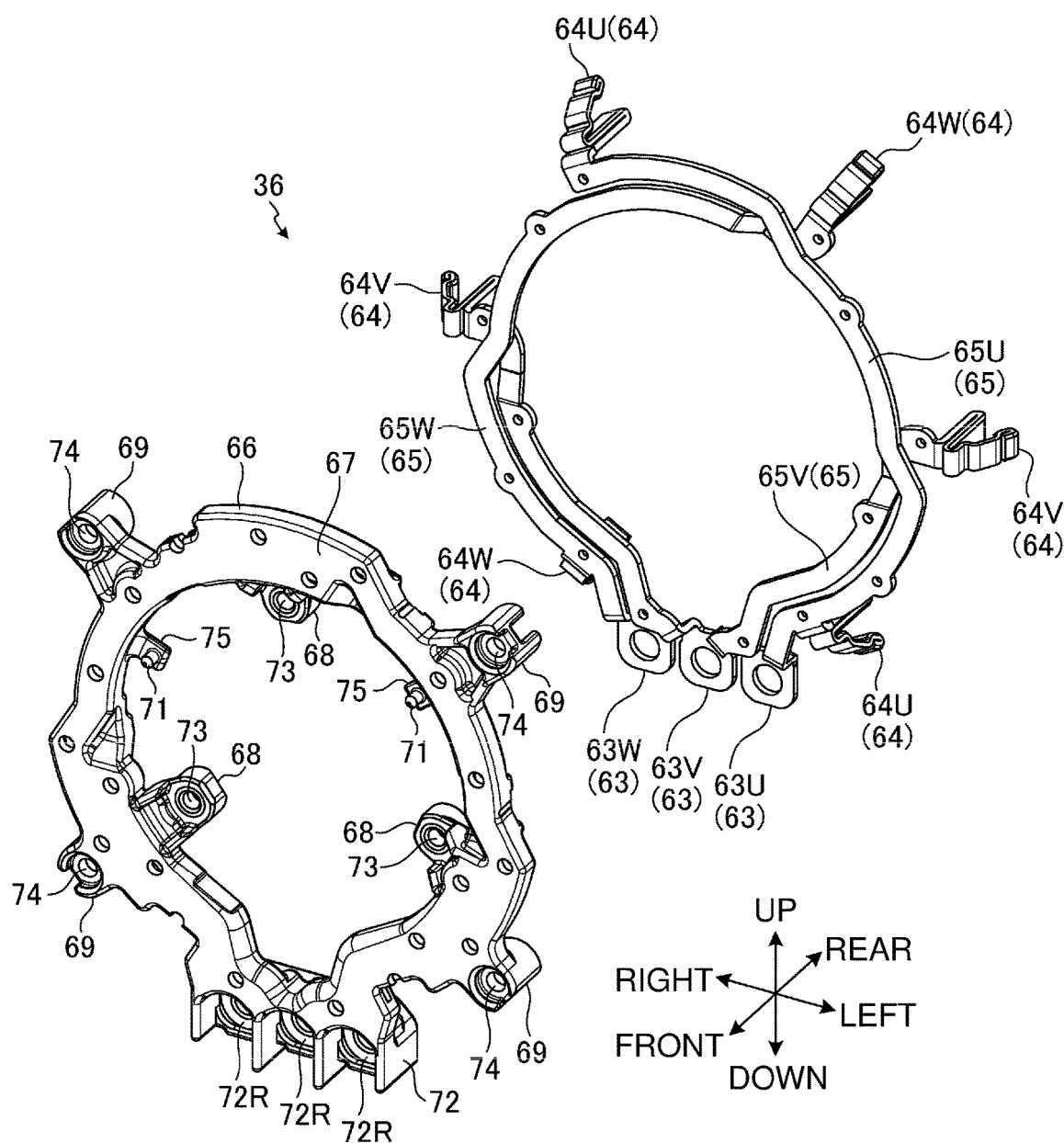
FIG. 13 is an exploded front perspective view of a busbar unit in the embodiment.
Figure 14:
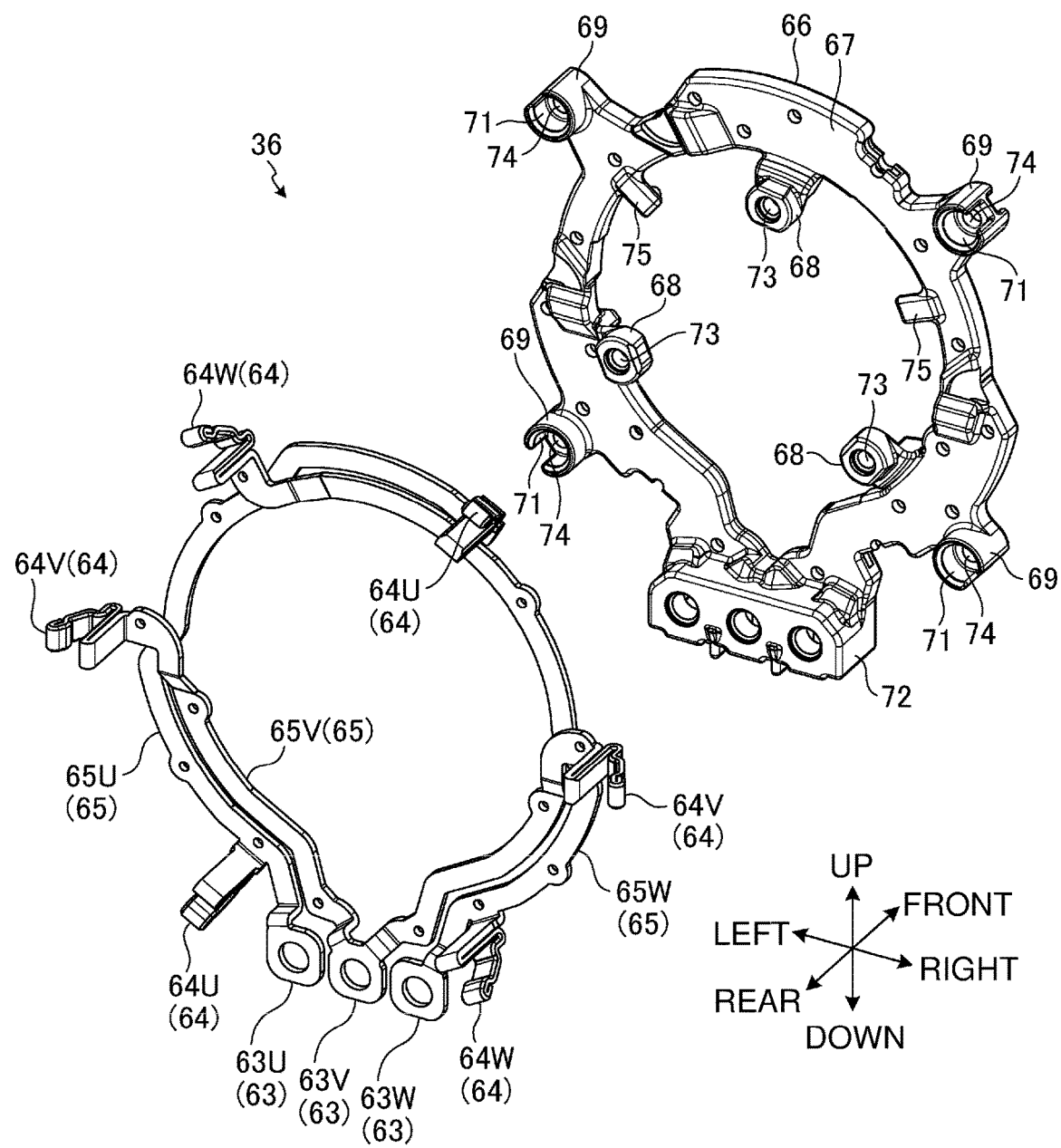
FIG. 14 is an exploded rear perspective view of the busbar unit in the embodiment.

FIG. 13 is an exploded front perspective view of the busbar unit 36 in the present embodiment. FIG. 14 is an exploded rear perspective view of the busbar unit 36 in the present embodiment.

A driving current from the battery pack 19 is supplied to the busbar unit 36 through the controller 9. The controller 9 controls the driving current supplied from the battery pack 19 to the busbar unit 36. The busbar unit 36 includes external terminals 63, fuse terminals 64, short-circuiting members 65, and an insulating member 66.

The external terminals 63 are connected to the battery pack 19 through the controller 9. A driving current from the battery pack 19 is supplied to the external terminals 63 through power supply lines. The busbar unit 36 in the present embodiment includes three external terminals 63.

The fuse terminals 64 are connected to the coils 35 with the connection wires 62. The fuse terminals 64 conduct electricity. The connection wires 62 supported by the wire supports 56 are connected to the fuse terminals 64. Each connection wire 62 is placed in a bent portion of the corresponding fuse terminal 64. Each fuse terminal 64 and the corresponding connection wire 62 are welded together. The fuse terminals 64 are thus connected to the coils 35 with the connection wires 62.

In the axial direction, the middle portion 35M is located between the center of the coil 35 and the rear end of the coil 35. Each connection wire 62 is located between the center of the corresponding coil 35 and the front end of the coil 35. The fuse terminals 64 are thus connected to the connection wires 62 without interfering with the middle portion 35M.

The multiple (six in the present embodiment) fuse terminals 64 surround the rotation axis AX. The fuse terminals 64 are aligned in the axial direction and correspond one-to-one with the coils 35.

Each short-circuiting member 65 connects (short-circuits) a pair of connection wires 62 radially opposed to each other. A pair of connection wires 62 radially opposed to each other are 180° apart from each other in the circumferential direction. The short-circuiting members 65 connect the external terminals 63 and the fuse terminals 64. The short-circuiting members 65 conduct electricity. Each short-circuiting member 65 is curved in a plane orthogonal to the rotation axis AX. The busbar unit 36 includes the multiple (three in the present embodiment) short-circuiting members 65. Each short-circuiting member 65 connects (short-circuits) one external terminal 63 and two fuse terminals 64.

The insulating member 66 is formed from a synthetic resin. The insulating member 66 surrounds the rotation axis AX. The insulating member 66 supports the external terminals 63 and the short-circuiting members 65. The insulating member 66 supports the fuse terminals 64 with the short-circuiting members 65 between them. The insulating member 66 includes a base 67, first screw bosses 68, second screw bosses 69, positioning pins 70, positioning recesses 71, and a joint 72.

The base 67 is annular. Each short-circuiting member 65 is at least partially inside the base 67. The base 67 is integral with the short-circuiting members 65. The short-circuiting members 65 are molded with a synthetic resin used for the base 67. The base 67 may be fixed to the short-circuiting members 65 by, for example, insert molding. The base 67 insulates the three short-circuiting members 65 from one another.

The first screw bosses 68 protrude radially inward from the inner edge of the base 67. The multiple (three in the present embodiment) first screw bosses 68 are located at circumferentially equal intervals. Each first screw boss 68 has a screw hole 73.

The second screw bosses 69 protrude radially outward from the outer edge of the base 67. The multiple (four in the present embodiment) second screw bosses 69 are located circumferentially. Each second screw boss 69 has an opening 74.

The positioning pins 70 are radially inward from the base 67. The insulating member 66 includes supports 75 protruding radially inward from the inner edge of the base 67. Each positioning pin 70 protrudes frontward from the corresponding support 75. The multiple (two in the present embodiment) supports 75 and the multiple positioning pins 70 are located circumferentially. A single positioning pin 70 is located on each of the supports 75.

The positioning recesses 71 are radially outward from the base 67. Each positioning recess 71 is located in the corresponding second screw boss 69. Each positioning recess 71 is recessed frontward from the rear end face of the corresponding second screw boss 69.

The joint 72 protrudes downward from a lower portion of the base 67. The joint 72 faces the joint 58 in the insulator 34. The joint 72 has three recesses 72R that receive the external terminals 63. Each recess 72R receives a single external terminal 63.

Figure 15:
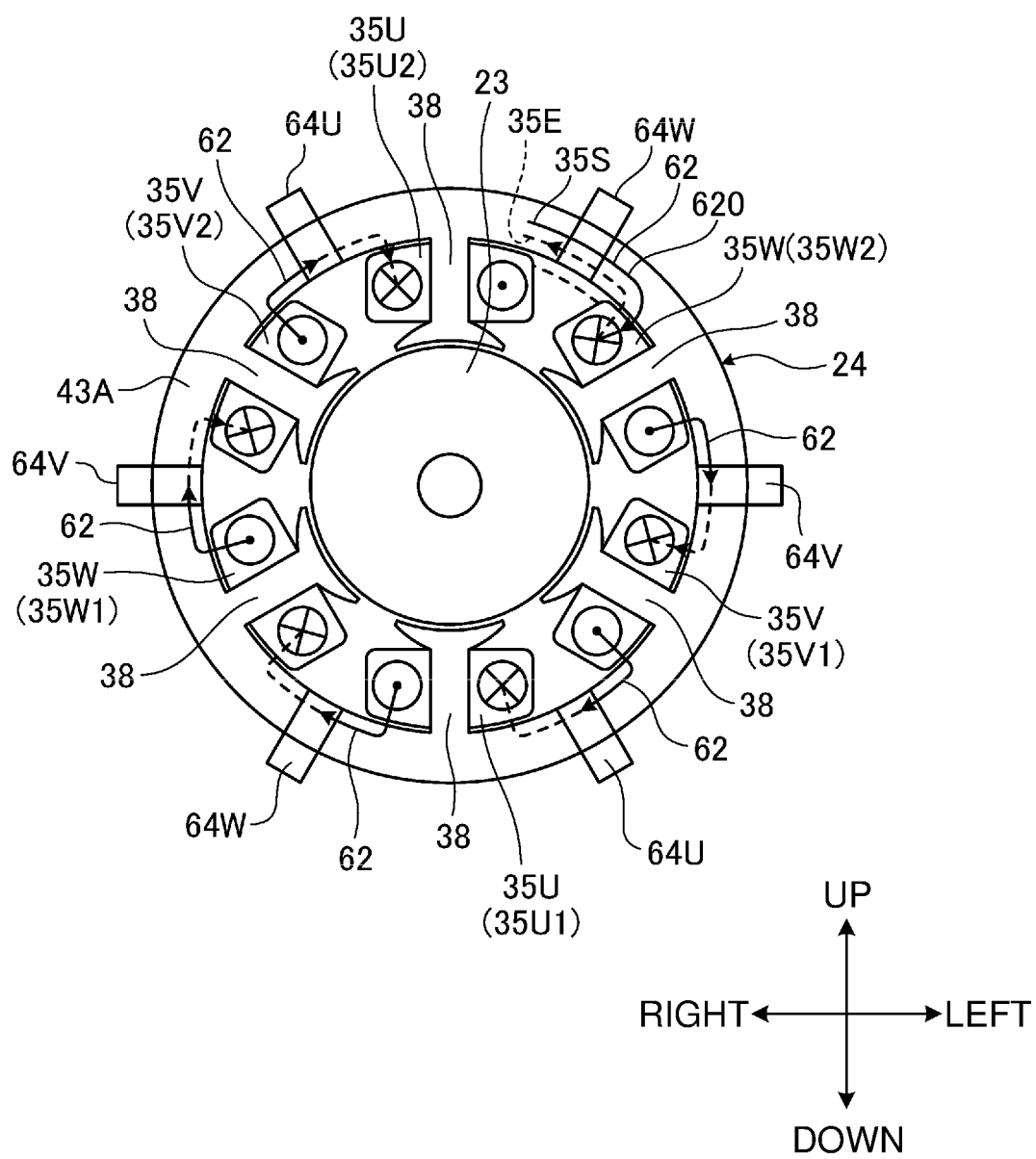
FIG. 15 is a schematic diagram of the stator in the embodiment.
Figure 16:
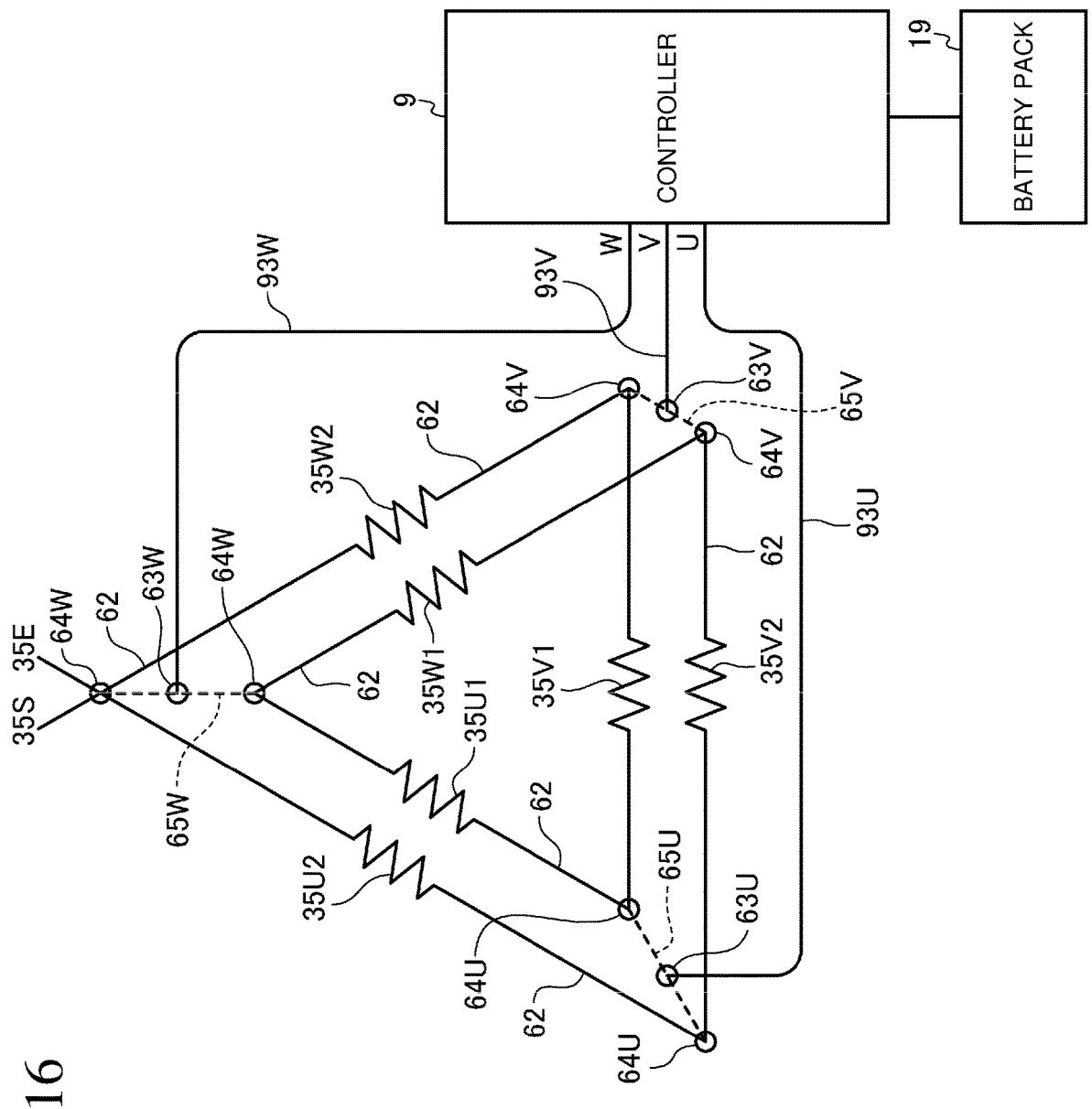
FIG. 16 is a schematic diagram of connected coils in the embodiment.

FIG. 15 is a schematic diagram of the stator 24 in the present embodiment. FIG. 16 is a schematic diagram of connected coils 35 in the present embodiment.

The multiple coils 35 are formed by winding the single wire 620. As shown in FIGS. 15 and 16, the wire 620 includes a wind start portion 35S first wound around one tooth 38. The wire 620 is wound sequentially around each of circumferentially adjacent teeth 38 to form the six coils 35. The wire 620 includes a wind end portion 35E that is wound finally.

A driving current from the battery pack 19 is supplied to the external terminals 63 in the busbar unit 36 through the controller 9 and the power supply lines. The driving current supplied from the battery pack 19 to the external terminals 63 flows through the short-circuiting members 65 and the fuse terminals 64, and is then supplied to the coils 35 through the connection wires 62.

In the present embodiment, a driving current supplied from the battery pack 19 to the motor 20 includes a U-phase driving current, a V-phase driving current, and a W-phase driving current.

The power supply lines include a power supply line 93U, a power supply line 93V, and a power supply line 93W. The U-phase driving current is supplied to the power supply line 93U. The V-phase driving current is supplied to the power supply line 93V. The W-phase driving current is supplied to the power supply line 93W.

The external terminals 63 include an external terminal 63U, an external terminal 63V, and an external terminal 63W. The U-phase driving current is supplied to the external terminal 63U. The V-phase driving current is supplied to the external terminal 63V. The W-phase driving current is supplied to the external terminal 63W.

The short-circuiting members 65 include short-circuiting members 65U, 65V, and 65W. The short-circuiting member 65U is connected to the power supply line 93U through the external terminal 63U. The short-circuiting member 65V is connected to the power supply line 93V through the external terminal 63V. The short-circuiting member 65W is connected to the power supply line 93W through the external terminal 63W.

Each fuse terminal 64 includes pairs of fuse terminals 64U, 64V, and 64W. The pair of fuse terminals 64U are connected to the short-circuiting member 65U. The pair of fuse terminals 64V are connected to the short-circuiting member 65V. The pair of fuse terminals 64W are connected to the short-circuiting member 65W.

As shown in FIGS. 13 and 14, the short-circuiting member 65U connects the external terminal 63U and each of the pair of fuse terminals 64U. The short-circuiting member 65V connects the external terminal 63V and each of the pair of fuse terminals 64V. The short-circuiting member 65W connects the external terminal 63W and each of the pair of fuse terminals 64W. The external terminal 63U, the fuse terminals 64U, and the short-circuiting member 65U are integral with one another. The external terminal 63V, the fuse terminals 64V, and the short-circuiting member 65V are integral with one another. The external terminal 63W, the fuse terminals 64W, and the short-circuiting member 65W are integral with one another.

When the busbar unit 36 has a circumferentially upper end located at 0°, a circumferentially left end at 90°, a circumferentially lower end at 180°, and a circumferentially right end at 270°, the external terminal 63U is located at 180°. One fuse terminal 64U is located at 150°. The other fuse terminal 64U is located at 330°.

The external terminal 63V is located at 180°. One fuse terminal 64V is located at 90°. The other fuse terminal 64V is located at 270°.

The external terminal 63W is located at 180°. One fuse terminal 64W is located at 30°. The other fuse terminal 64W is located at 210°.

Each of the six coils 35 is assigned to one of a U-(U-V-) phase, a V-(V-W-) phase, and a W-(W-U-) phase.

Each pair of coils 35 is assigned to the U-phase, the V-phase, or the W-phase. The six coils 35 include a pair of U-phase coils 35U assigned to the U-phase, a pair of V-phase coils 35V assigned to the V-phase, and a pair of W-phase coils 35W assigned to the W-phase.

As shown in FIGS. 11 and 12, the pair of U-phase coils 35U are radially opposed to each other. The pair of V-phase coils 35V are radially opposed to each other. The pair of W-phase coils 35W are radially opposed to each other.

As shown in FIG. 15, a U-phase coil 35U1 is circumferentially adjacent to a V-phase coil 35V1. The V-phase coil 35V1 is adjacent to a W-phase coil 35W2. The W-phase coil 35W2 is adjacent to a U-phase coil 35U2. The U-phase coil 35U2 is adjacent to a V-phase coil 35V2. The V-phase coil 35V2 is adjacent to a W-phase coil 35W1. The U-phase coil 35U1 and the U-phase coil 35U2 are radially opposed to each other. The V-phase coil 35V1 and the V-phase coil 35V2 are radially opposed to each other. The W-phase coil 35W1 and the W-phase coil 35W2 are radially opposed to each other.

One fuse terminal 64U is connected to the connection wire 62 connecting the U-phase coil 35U1 and the circumferentially adjacent V-phase coil 35V1. The other fuse terminal 64U is connected to the connection wire 62 connecting the U-phase coil 35U2 and the circumferentially adjacent V-phase coil 35V2. One fuse terminal 64V is connected to the connection wire 62 connecting the V-phase coil 35V1 and the circumferentially adjacent W-phase coil 35W2. The other fuse terminal 64V is connected to the connection wire 62 connecting the V-phase coil 35V2 and the circumferentially adjacent W-phase coil 35W1. One fuse terminal 64W is connected to the connection wire 62 connecting the W-phase coil 35W2 and the circumferentially adjacent U-phase coil 35U2. The other fuse terminal 64W is connected to the connection wire 62 connecting the W-phase coil 35W1 and the circumferentially adjacent U-phase coil 35U1.

As shown in FIG. 16, a set of the U-phase coil 35U1, the V-phase coil 35V1, and the W-phase coil 35W1 is delta-connected. A set of the U-phase coil 35U2, the V-phase coil 35V2, and the W-phase coil 35W2 is delta-connected. The two delta connections are arranged in parallel.

The U-phase driving current input into the power supply line 93U is supplied to the pair of fuse terminals 64U through the short-circuiting member 65U. When the U-phase coil 35U1 is excited to be a north pole, the U-phase coil 35U2 is excited to be a south pole. The V-phase coil 35V1 adjacent to the U-phase coil 35U1 excited to be a north pole is excited to be a south pole. The V-phase coil 35V2 adjacent to the U-phase coil 35U2 excited to be a south pole is excited to be a north pole.

The V-phase driving current input into the power supply line 93V is supplied to the pair of fuse terminals 64V through the short-circuiting member 65V. When the V-phase coil 35V1 is excited to be a north pole, the V-phase coil 35V2 is excited to be a south pole. The W-phase coil 35W1 adjacent to the V-phase coil 35V1 excited to be a north pole is excited to be a south pole. The W-phase coil 35W2 adjacent to the V-phase coil 35V2 excited to be a south pole is excited to be a north pole.

The W-phase driving current input into the power supply line 93W is supplied to the pair of fuse terminals 64W through the short-circuiting member 65W. When the W-phase coil 35W1 is excited to be a north pole, the W-phase coil 35W2 is excited to be a south pole. The U-phase coil 35U1 adjacent to the W-phase coil 35W1 excited to be a north pole is excited to be a south pole. The U-phase coil 35U2 adjacent to the W-phase coil 35W2 excited to be a south pole is excited to be a north pole.

Sensor Unit

The sensor unit 22 detects rotation of the rotor 23. The sensor unit 22 at least partially faces the rotor 23.

As shown in FIGS. 7 and 8, the sensor unit 22 includes a sensor board 76 and a connector 77. The sensor board 76 includes rotation sensors 78, a plate 79, and an insulating member 82.

The rotation sensors 78 detect rotation of the rotor 23. The rotation sensors 78 detect the positions of the permanent magnets 29 held in the rotor core 27 to detect the position of the rotor 23 in the rotation direction. The rotation sensors 78 are magnetic sensors each including a Hall device. The sensor board 76 includes three rotation sensors 78. The rotation sensors 78 are radially inward from the coils 35. The rotation sensors 78 face the end face 27F at the front of the rotor core 27.

The plate 79 supports the rotation sensors 78. The plate 79 is annular. The plate 79 surrounds the rotation axis AX. The plate 79 has multiple (three in the present embodiment) openings 88 to receive first screws 87.

The plate 79 has multiple (two in the present embodiment) positioning holes 89 to receive the positioning pins 70.

The rotation sensors 78 output detection signals to the controller 9 through the connector 77. The controller 9 supplies a driving current to the coils 35 in response to the detection signals from the rotation sensors 78.

The insulating member 82 covers the rotation sensors 78 and at least a part of the surface of the plate 79. The insulating member 82 is formed from a synthetic resin. The sensor board 76 in the embodiment includes a molded interconnect device (MID).

Assembling Motor Assembly

To assemble the motor assembly 6, the insulator 34 is fixed to the stator core 33, and then the coils 35 are wound around the insulator 34. Subsequently, the busbar unit 36 is connected to the insulator 34, and then the sensor unit 22 is connected to the busbar unit 36.

To connect the insulating member 66 in the busbar unit 36 and the insulator 34 with each other, each screw boss 57 in the insulator 34 is received in the corresponding positioning recess 71 in the busbar unit 36. The screw bosses 57 serve as positioning protrusions received in the positioning recesses 71. The insulating member 66 in the busbar unit 36 and the insulator 34 are thus positioned relative to each other.

The insulating member 66 in the busbar unit 36 is fastened to the insulator 34. The motor assembly 6 includes second screws 92. The second screws 92 fasten the insulating member 66 in the busbar unit 36 and the insulator 34 together. Each second screw 92 is received in the screw hole 61 in the corresponding screw boss 57 in the insulator 34 through the opening 74 in the corresponding second screw boss 69 in the insulating member 66. The second screws 92 fasten the insulating member 66 in the busbar unit 36 and the insulator 34 together. The busbar unit 36 is at least partially frontward from the insulator 34.

As described above, the connection wires 62 and the fuse terminals 64 are connected with each other. Each connection wire 62 is received in a bent portion of the corresponding fuse terminal 64. Each connection wire 62 is fixed to the corresponding fuse terminal 64 by fusing.

To connect the sensor unit 22 and the busbar unit 36 with each other, each positioning pin 70 on the busbar unit 36 is received in the corresponding positioning hole 89 in the sensor unit 22. The plate 79 in the sensor unit 22 and the insulating member 66 in the busbar unit 36 are thus positioned relative to each other.

The sensor board 76 in the sensor unit 22 is fastened to the insulating member 66 in the busbar unit 36. The motor assembly 6 includes the first screws 87 fastening the sensor board 76 and the insulating member 66 together. Each first screw 87 is received in the screw hole 73 in the corresponding first screw boss 68 in the insulating member 66 through the corresponding opening 88 in the plate 79. The first screws 87 fasten the sensor board 76 and the insulating member 66 in the busbar unit 36 together. The sensor board 76 is at least partially radially inward from the insulating member 66 in the busbar unit 36.

Housing

Figure 17:
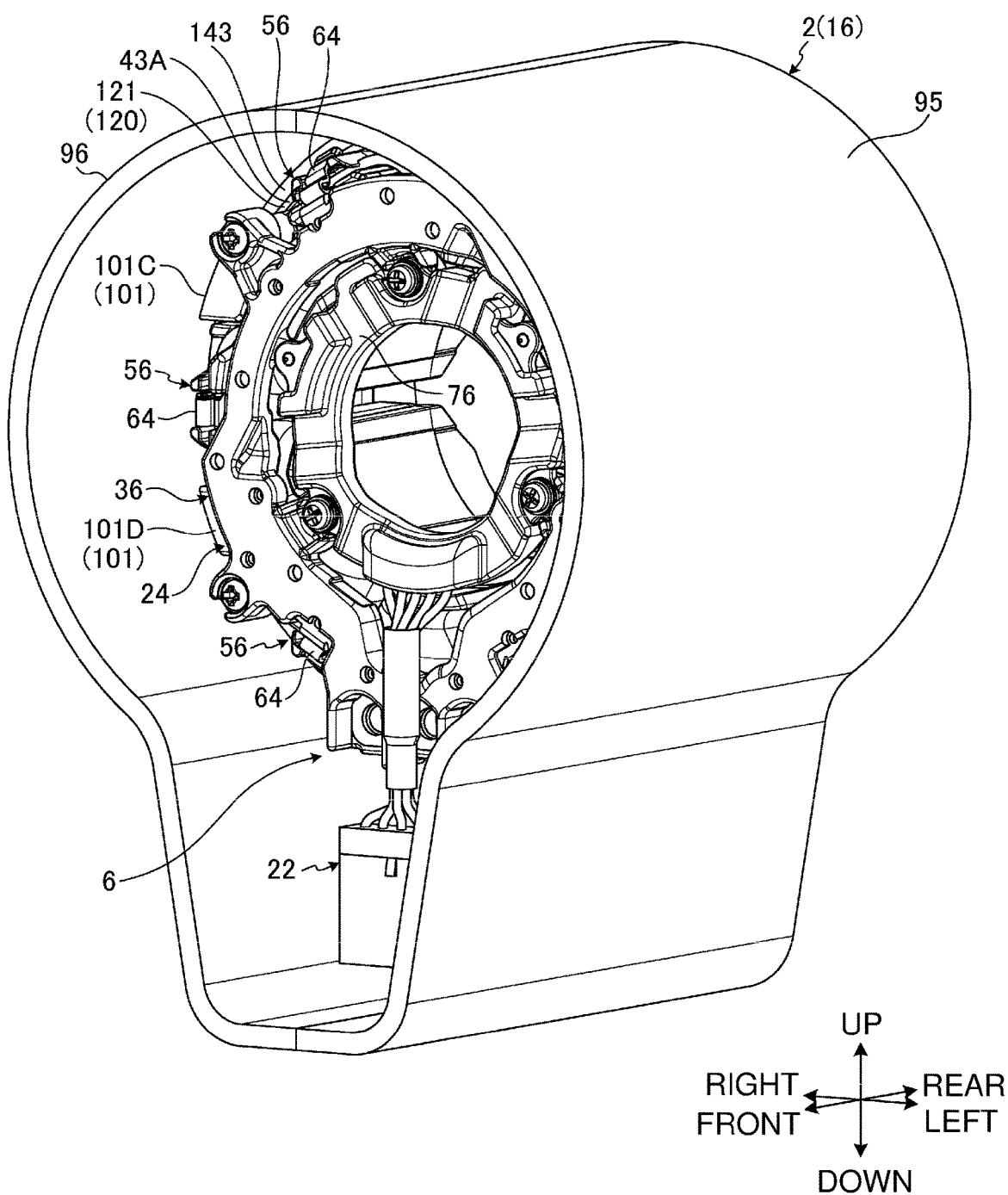
FIG. 17 is a front perspective view of a housing accommodating the motor assembly in the embodiment.
Figure 18:
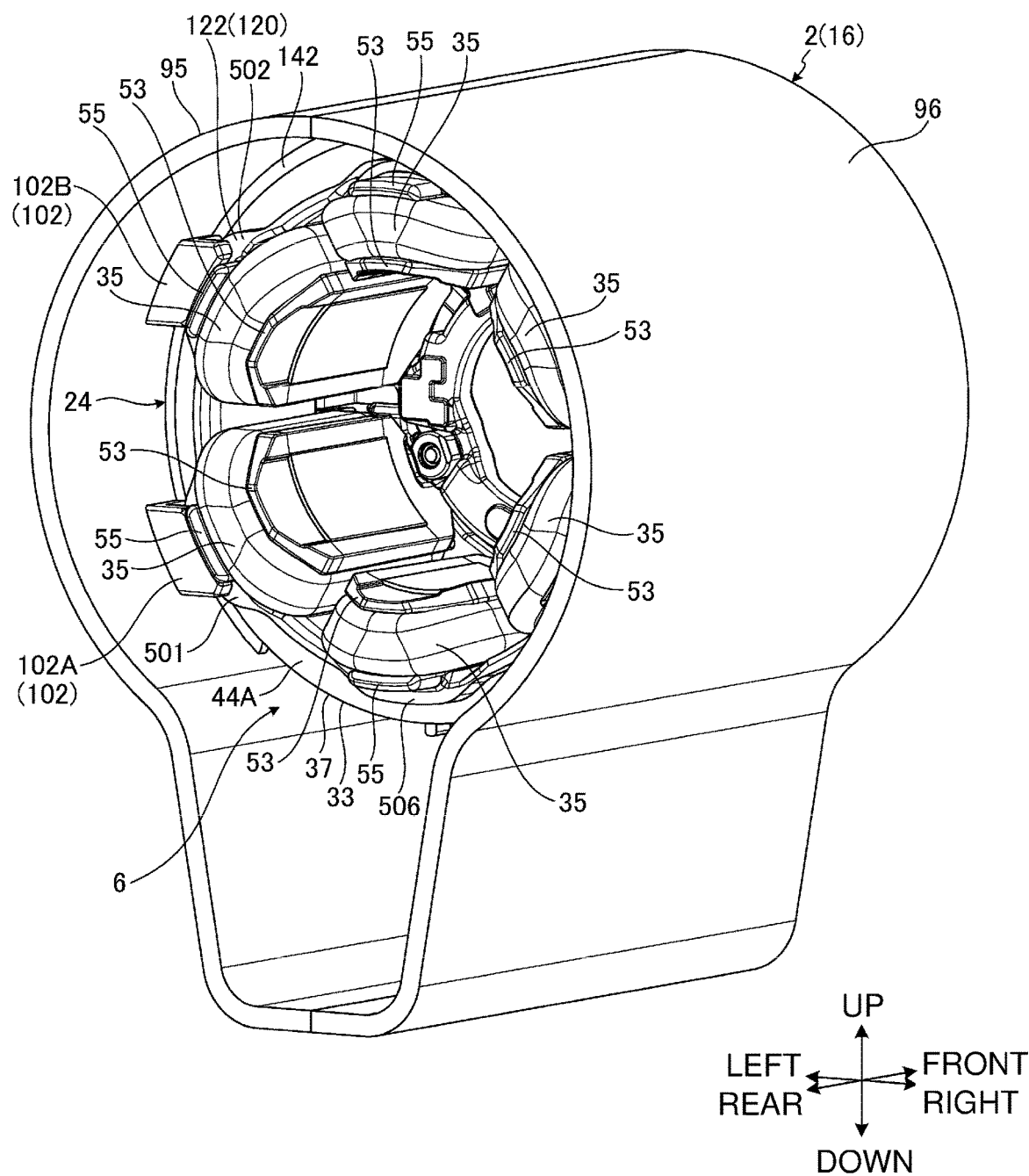
FIG. 18 is a rear perspective view of the housing accommodating the motor assembly in the embodiment.
Figure 19:
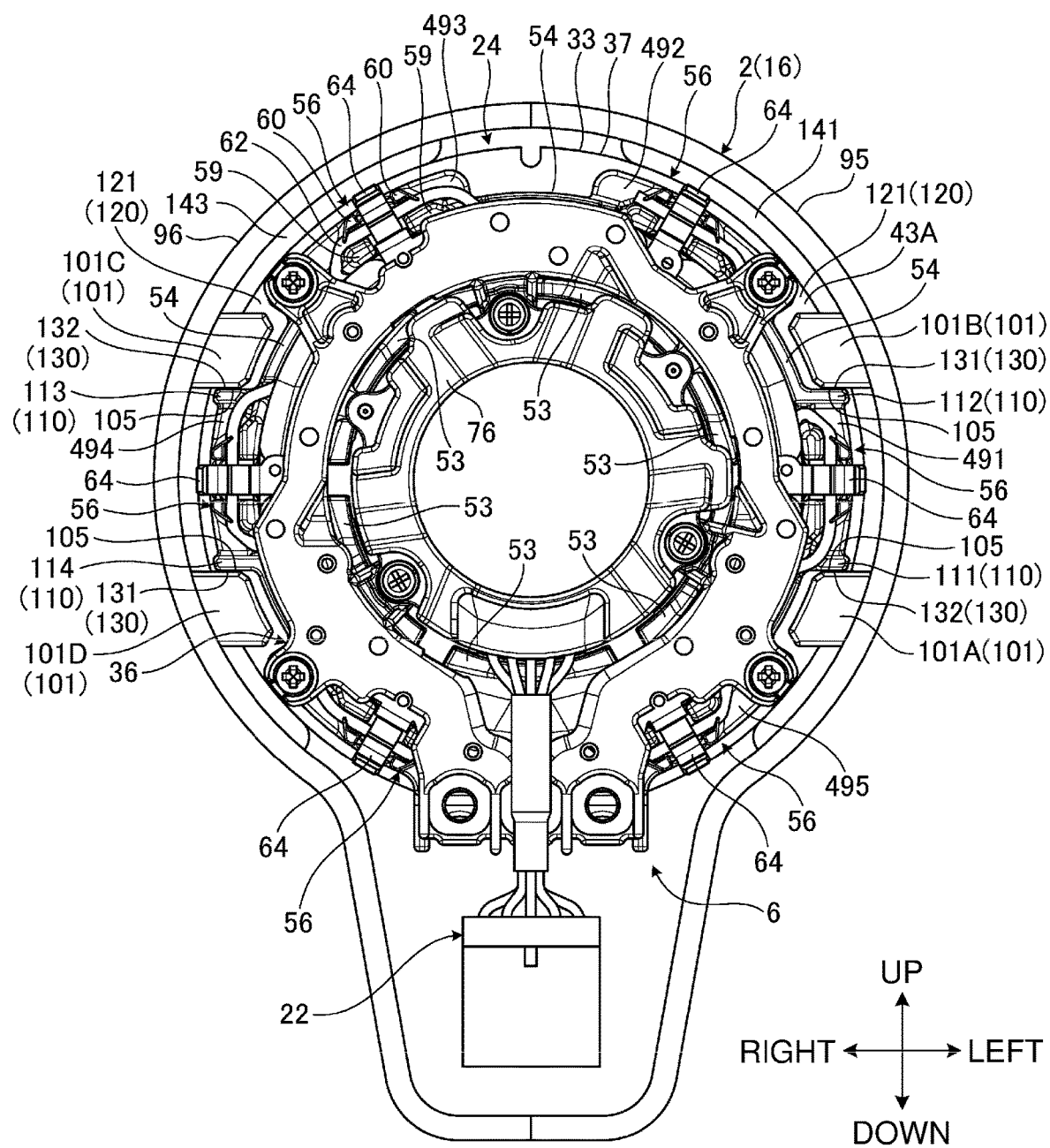
FIG. 19 is a front view of the housing accommodating the motor assembly in the embodiment.
Figure 20:
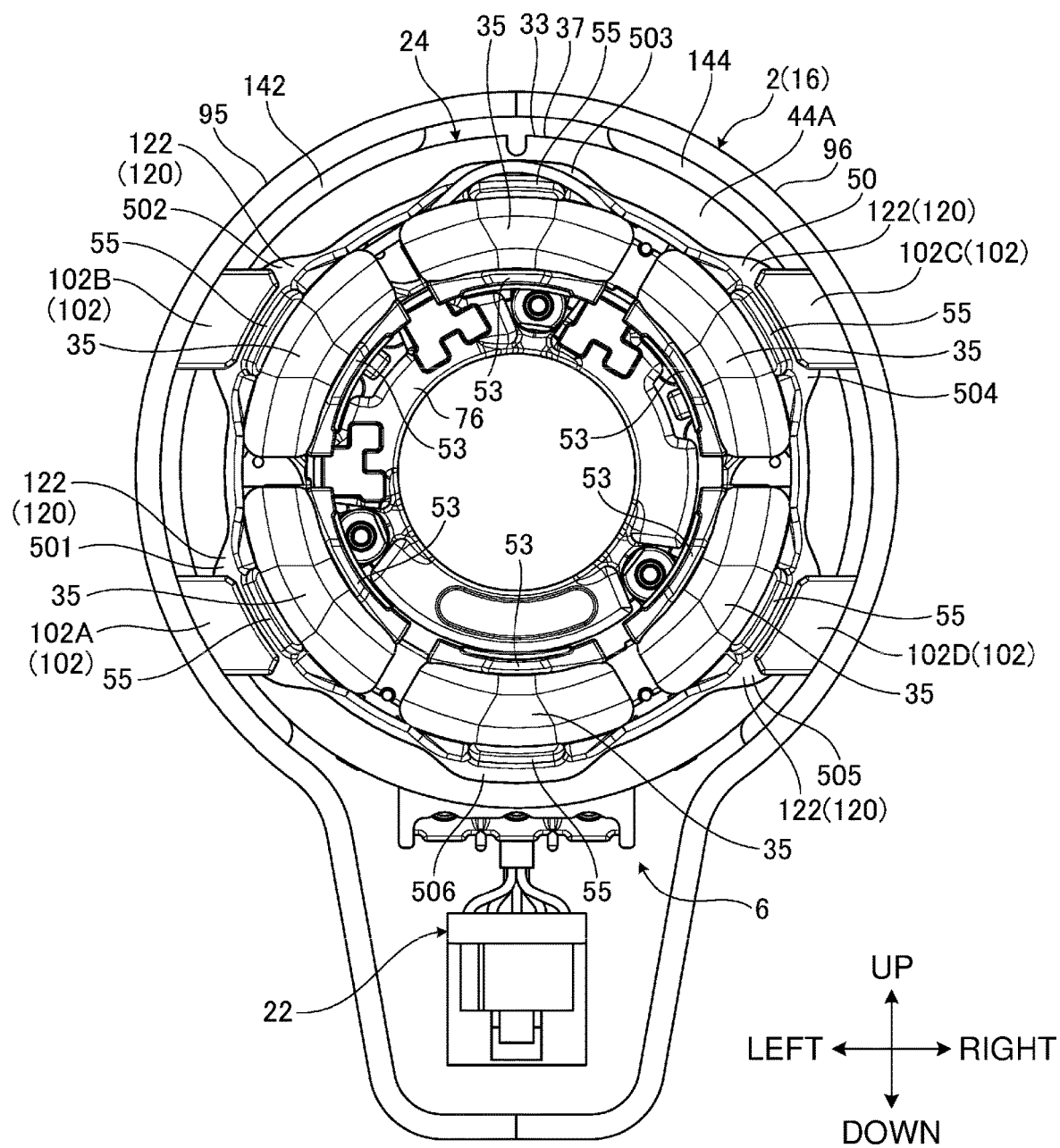
FIG. 20 is a rear view of the housing accommodating the motor assembly in the embodiment.
Figure 21:
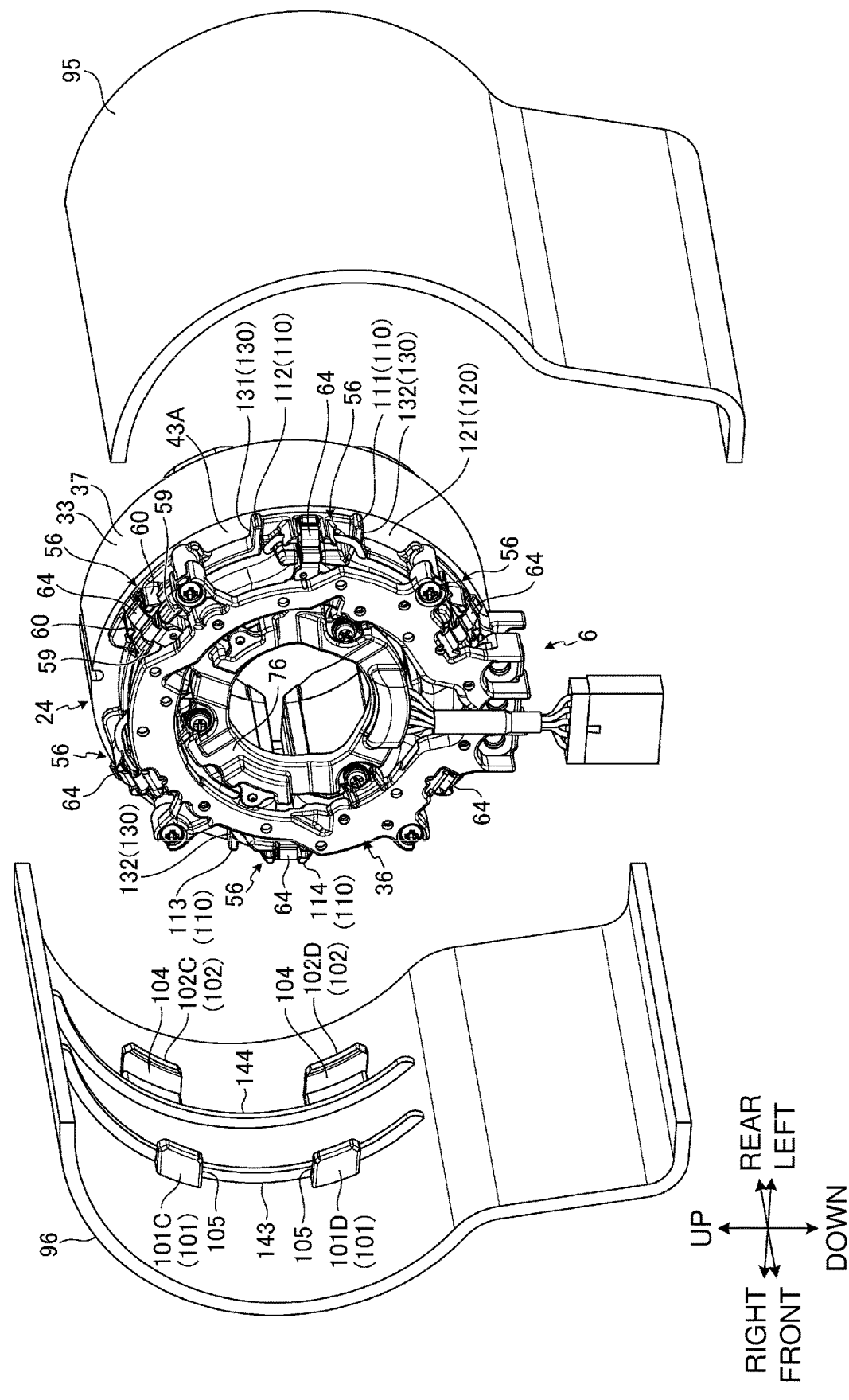
FIG. 21 is an exploded front perspective view of the housing in the embodiment.
Figure 22:
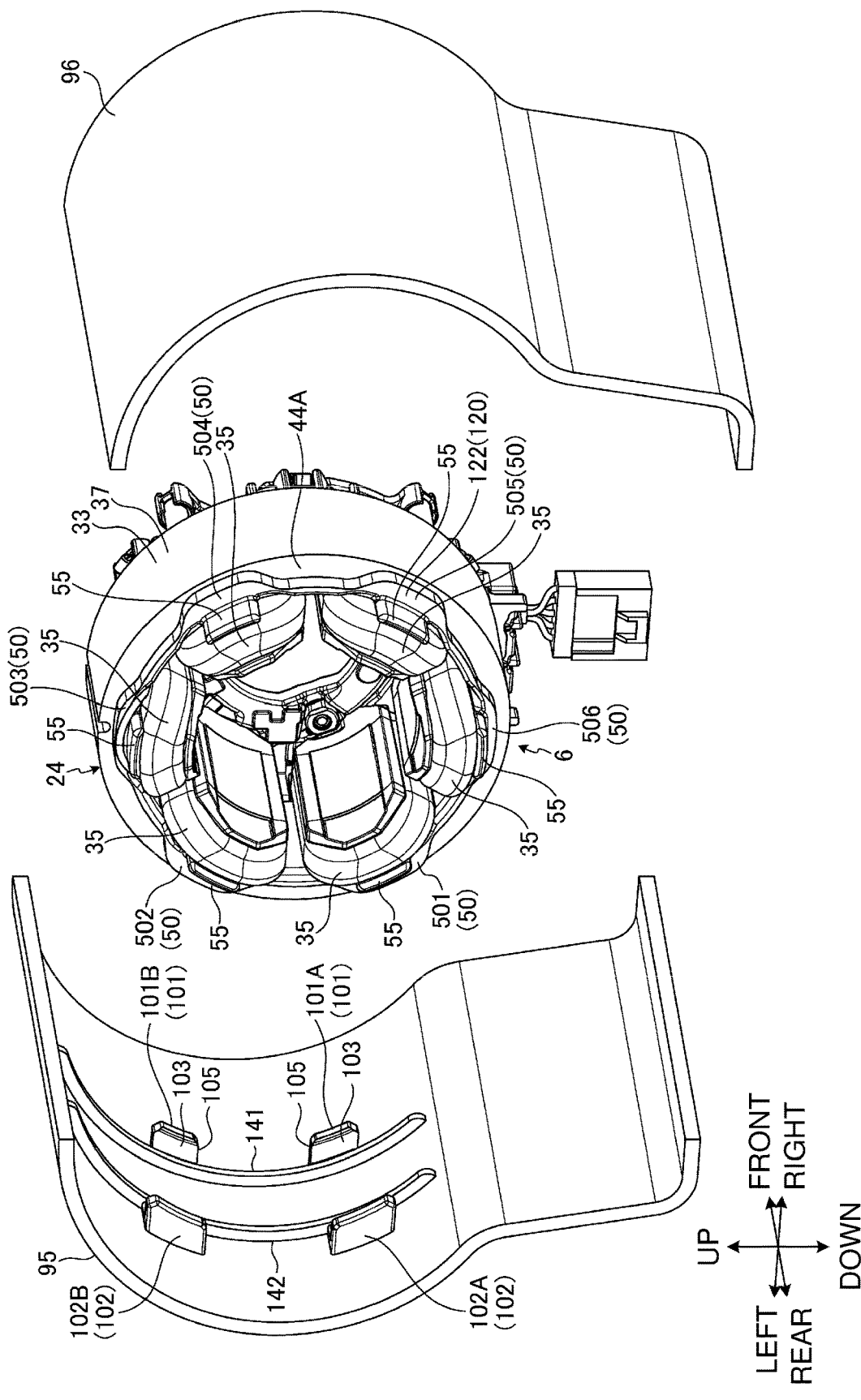
FIG. 22 is an exploded rear perspective view of the housing in the embodiment.
Figure 23:
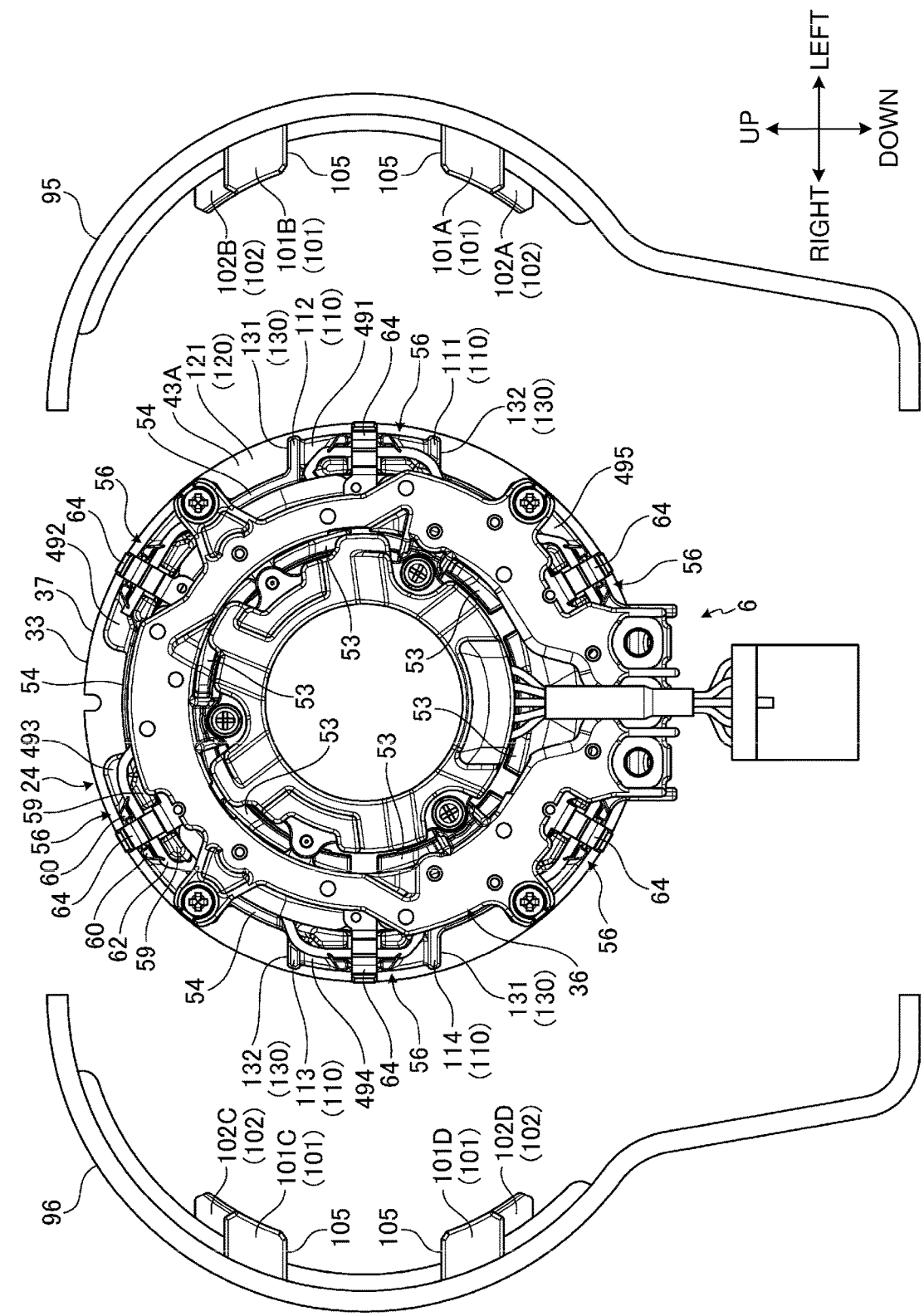
FIG. 23 is an exploded front view of the housing in the embodiment.
Figure 24:
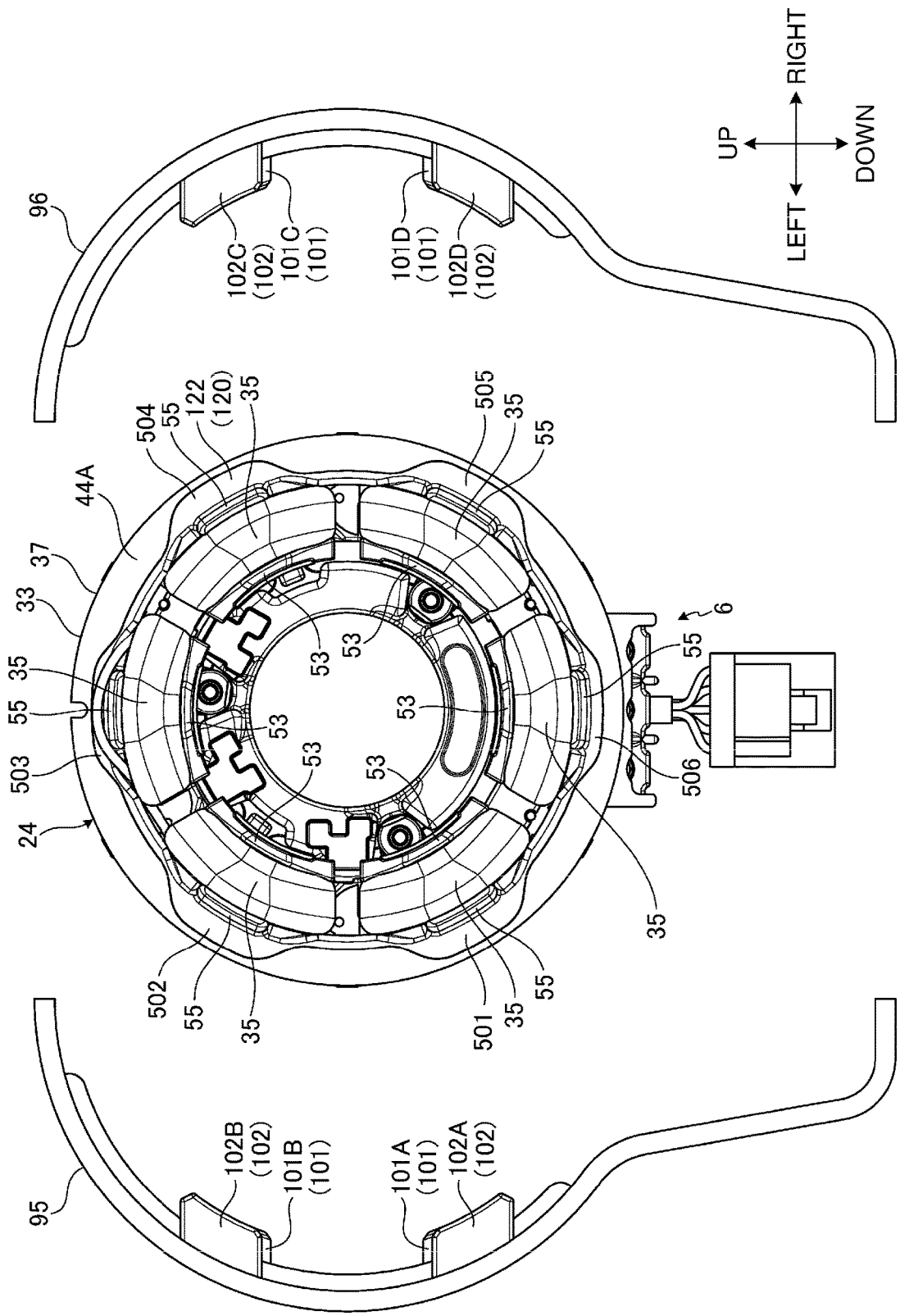
FIG. 24 is an exploded rear view of the housing in the embodiment.
Figure 25:
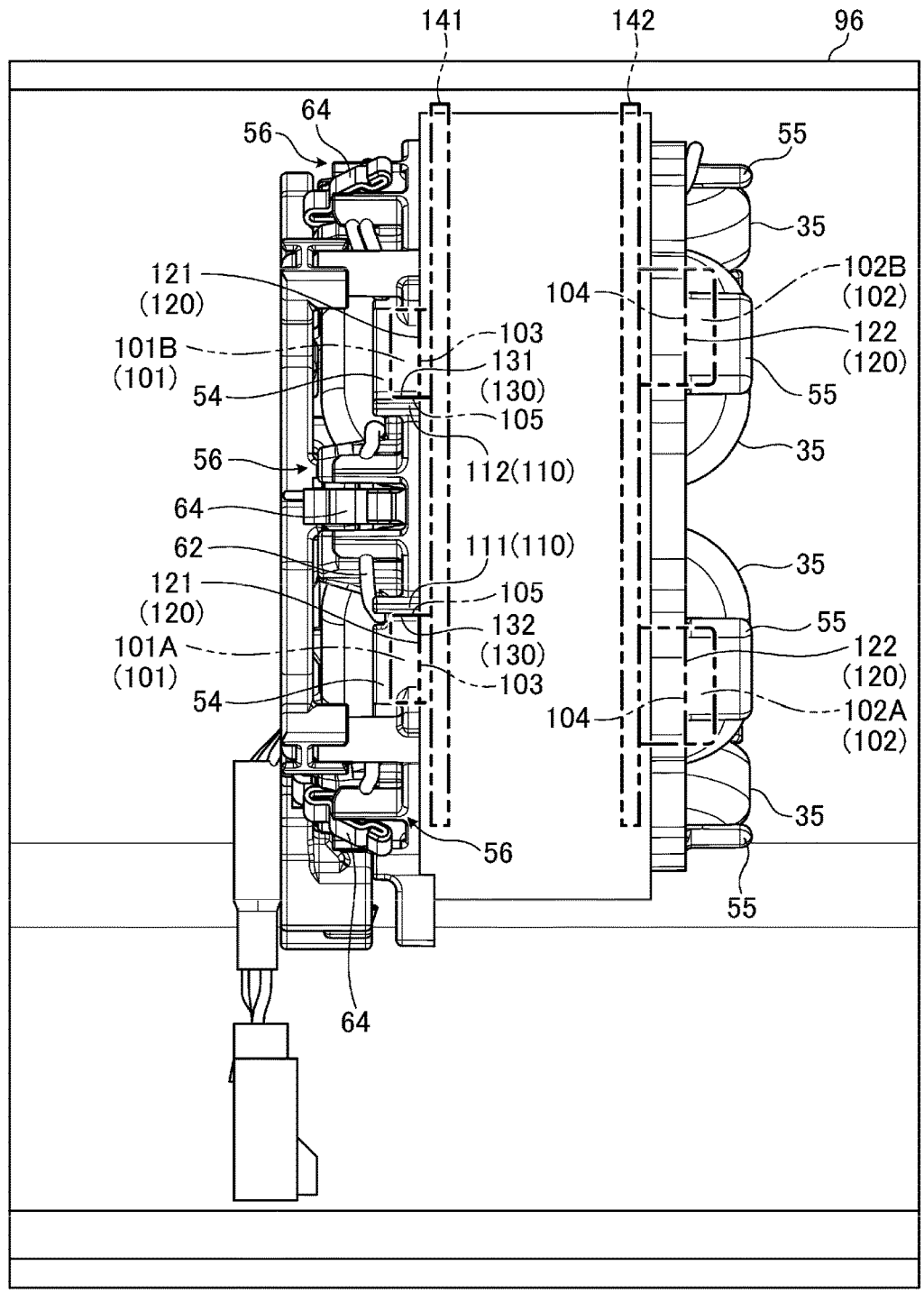
FIG. 25 is a left side view of the housing accommodating the motor assembly in the embodiment.
Figure 25:
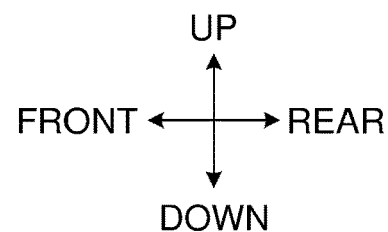
Figure 26:
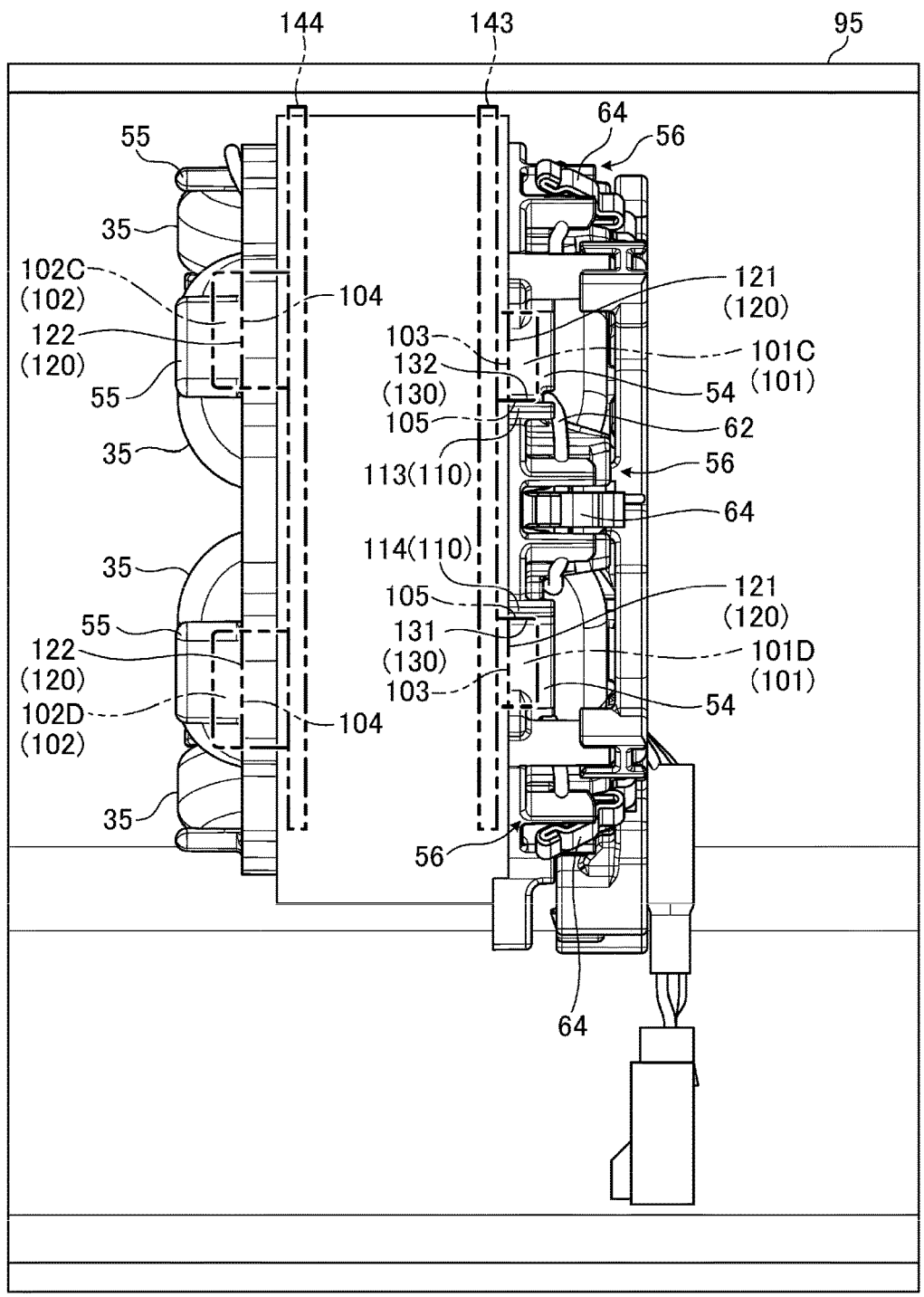
FIG. 26 is a right side view of the housing accommodating the motor assembly in the embodiment.

FIG. 17 is a front perspective view of the housing 2 accommodating the motor assembly 6 in the embodiment. FIG. 18 is a rear perspective view of the housing 2 accommodating the motor assembly 6 in the embodiment. FIG. 19 is a front view of the housing 2 accommodating the motor assembly 6 in the embodiment. FIG. 20 is a rear view of the housing 2 accommodating the motor assembly 6 in the embodiment. FIG. 21 is an exploded front perspective view of the housing 2 in the embodiment. FIG. 22 is an exploded rear perspective view of the housing 2 in the embodiment. FIG. 23 is an exploded front view of the housing 2 in the embodiment. FIG. 24 is an exploded rear view of the housing 2 in the embodiment. FIG. 25 is a left side view of the housing 2 accommodating the motor assembly 6 in the embodiment. FIG. 26 is a right side view of the housing 2 accommodating the motor assembly 6 in the embodiment. FIGS. 25 and 26 do not show parts of the housing 2 to describe the relationship between the housing 2 and the stator 24. In FIGS. 17 to 26, the housing 2 corresponds to the motor compartment 16 shown schematically.

The housing 2 is formed from a synthetic resin. The housing 2 includes a first half housing 95 and a second half housing 96. The second half housing 96 is combined with the first half housing 95. The first half housing 95 is located on the left of the second half housing 96. The first half housing 95 and the second half housing 96 are fastened together with multiple screws (not shown).

The housing 2 includes first tabs 101 and second tabs 102. The first tabs 101 are in contact with at least a part of the surface of the stator 24. The second tabs 102 are in contact with at least a part of the surface of the stator 24. The first tabs 101 and the second tabs 102 are located on the inner surface of the housing 2. The first tabs 101 protrude radially inward from the inner surface of the housing 2. The second tabs 102 protrude radially inward from the inner surface of the housing 2.

The first tabs 101 and the second tabs 102 are located at different positions in the axial direction. The first tabs 101 in the embodiment are located frontward from the second tabs 102.

The surface of the stator 24 includes axially-facing surfaces 120 facing in the axial direction. The axially-facing surfaces 120 include a first axially-facing surface 121 (front surface) facing frontward and a second axially-facing surface 122 (rear surface) facing rearward. Each first tab 101 includes a first support surface 103 (rear surface) in contact with the first axially-facing surface 121. Each second tab 102 includes a second support surface 104 (front surface) in contact with the second axially-facing surface 122. Each first support surface 103 faces rearward. Each second support surface 104 faces frontward.

The first axially-facing surface 121 corresponds to, for example, the end face 43A of the outer cylinder 37 in the stator core 33.

The second axially-facing surface 122 corresponds to, for example, surfaces of the covers 50 in the insulator 34 that cover at least a part of the end face 44A. The covers 50 include, as described above, at least a part of each of the cover area 501, the cover area 502, the cover area 503, the cover area 504, the cover area 505, and the cover area 506.

Each first tab 101 in the embodiment has the first support surface 103 in contact with the end face 43A. Each second tab 102 has the second support surface 104 in contact with the surface of the corresponding cover 50. The second tabs 102 in the embodiment are in contact with the surfaces of the cover area 501, the cover area 502, the cover area 504, and the cover area 505.

The stator 24 is at least partially held between the first tabs 101 and the second tabs 102 in the axial direction. The housing 2 supports the motor assembly 6 with the first tabs 101 and the second tabs 102.

The fuse terminals 64 are located frontward from the stator core 33. As shown in FIGS. 25 and 26, the first tabs 101 and at least a part of each fuse terminal 64 are at the same position in the axial direction. In the embodiment, the first tabs 101 and the rear end of each fuse terminal 64 are at the same position in the axial direction.

The first tabs 101 and at least a part of each wire support 56 are at the same position in the axial direction. The first tabs 101 and at least a part of each coil stopper 54 are at the same position in the axial direction. The first tabs 101 are located rearward from the front end of each coil stopper 54.

The first tabs 101 and at least a part of each coil 35 are at the same position in the axial direction. The first tabs 101 are located rearward from the front end of each coil 35. The first tabs 101 are located rearward from the connection wires 62.

The coil stoppers 55 are located rearward from the stator core 33. As shown in FIGS. 25 and 26, the second tabs 102 and at least a part of each coil stopper 55 are at the same position in the axial direction. The second tabs 102 are located frontward from the rear end of each coil stopper 55. The second tabs 102 are located frontward from the rear end of each coil 35.

As shown in, for example, FIGS. 17 and 19, the first tabs 101 and the fuse terminals 64 are at different positions in the circumferential direction. The first tabs 101 and the wire supports 56 are at different positions in the circumferential direction. The wire supports 56 and at least a part of each coil stopper 54 are at different positions in the circumferential direction. Each wire support 56 is located between adjacent coil stoppers 54 in the circumferential direction. Each first tab 101 and at least a part of a coil stopper 54 are at the same position in the circumferential direction. The first tabs 101 are radially outward from the coil stoppers 54. Each first tab 101 faces the radially outer surface of the corresponding coil stopper 54.

As shown in, for example, FIGS. 18 and 20, each second tab 102 and at least a part of a coil stopper 55 are at the same position in the circumferential direction. Each coil stopper 55 and at least a part of the corresponding cover 50 are at the same position in the circumferential direction. The second tabs 102 are radially outward from the coil stoppers 55. Each second tab 102 in contact with the corresponding cover 50 faces the radially outer surface of the corresponding coil stopper 55.

The surface of the stator 24 includes circumferentially-facing surfaces 130 facing in the circumferential direction. Each first tab 101 includes a contact surface 105 in contact with the corresponding circumferentially-facing surface 130. The circumferentially-facing surfaces 130 correspond to, for example, side surfaces of the ribs 110 on the covers 49.

The circumferentially-facing surfaces 130 in the embodiment include first circumferentially-facing surfaces 131 facing in the first circumferential direction, and second circumferentially-facing surfaces 132 facing in the second circumferential direction. The first circumferentially-facing surfaces 131 correspond to, for example, the upper surface of the rib 112 and the lower surface of the rib 114. The second circumferentially-facing surfaces 132 correspond to, for example, the lower surface of the rib 111 and the upper surface of the rib 113.

The multiple first tabs 101 are arranged about the rotation axis AX. Each first tab 101 is in contact with a first circumferentially-facing surface 131 or a second circumferentially-facing surface 132. The first tabs 101 in the embodiment include first tabs 101A to 101D. The first tab 101A is in contact with the lower surface of the rib 111. The first tab 101B is in contact with the upper surface of the rib 112. The first tab 101C is in contact with the upper surface of the rib 113. The first tab 101D is in contact with the lower surface of the rib 114.

The multiple second tabs 102 are arranged about the rotation axis AX. Each first tab 101 and at least a part of a second tab 102 are at the same position in the circumferential direction. The second tabs 102 in the embodiment include second tabs 102A to 102D. The second tabs 102A to 102D are respectively at the same position as at least a part of the first tabs 101A to 101D. The second tab 102A is in contact with the cover area 501. The second tab 102B is in contact with the cover area 502. The second tab 102C is in contact with the cover area 504. The second tab 102D is in contact with the cover area 505.

The multiple first tabs 101 include a first group of first tabs 101 on the first half housing 95 and a second group of first tabs 101 on the second half housing 96. The multiple second tabs 102 include a first group of second tabs 102 on the first half housing 95 and a second group of second tabs 102 on the second half housing 96. In the embodiment, the first tab 101A, the first tab 101B, the second tab 102A, and the second tab 102B are located on the first half housing 95. The first tab 101C, the first tab 101D, the second tab 102C, and the second tab 102D are located on the second half housing 96.

A support rib 141 and a support rib 142 are located on the inner surface of the first half housing 95. The support rib 141 and the support rib 142 protrude radially inward from the inner surface of the first half housing 95. The support rib 141 and the support rib 142 are curved in a plane orthogonal to the rotation axis AX. The support rib 141 connects the first tab 101A and the first tab 101B. The support rib 142 connects the second tab 102A and the second tab 102B.

A support rib 143 and a support rib 144 are located on the inner surface of the second half housing 96. The support rib 143 and the support rib 144 protrude radially inward from the inner surface of the second half housing 96. The support rib 143 and the support rib 144 are curved in a plane orthogonal to the rotation axis AX. The support rib 143 connects the first tab 101C and the first tab 101D. The support rib 144 connects the second tab 102C and the second tab 102D.

To fix the motor assembly 6 to the housing 2, the first tab 101A and the first tab 101B on the first half housing 95 come in contact with the first axially-facing surface 121. The second tab 102A and the second tab 102B on the first half housing 95 come in contact with the second axially-facing surface 122.

The first tab 101C and the first tab 101D on the second half housing 96 come in contact with the first axially-facing surface 121. The second tab 102C and the second tab 102D on the second half housing 96 come in contact with the second axially-facing surface 122.

The first tab 101A on the first half housing 95 comes in contact with the corresponding second circumferentially-facing surface 132. The first tab 101B on the first half housing 95 comes in contact with the corresponding first circumferentially-facing surface 131.

The first tab 101C on the second half housing 96 comes in contact with the corresponding second circumferentially-facing surface 132. The first tab 101D on the second half housing 96 comes in contact with the corresponding first circumferentially-facing surface 131.

The first tabs 101 in contact with the first axially-facing surface 121 and the second tabs 102 in contact with the second axially-facing surface 122 position the motor assembly 6 and the housing 2 in the axial direction.

One or more of the first tabs 101 in contact with the first circumferentially-facing surfaces 131 and the other first tabs 101 in contact with the second circumferentially-facing surfaces 132 position the motor assembly 6 and the housing 2 in the circumferential direction.

Once the motor assembly 6 and the housing 2 are positioned in the axial and circumferential directions, the first half housing 95 and the second half housing 96 are fastened together with the screws. The screws are tightened to place the first half housing 95 and the second half housing 96 to be closer to each other. This causes a front portion of the stator core 33 to be held tightly with the support rib 141 and the support rib 143, and a rear portion of the stator core 33 to be held tightly with the support rib 142 and the support rib 144. The motor assembly 6 is thus fixed to the housing 2.

As described above, in the embodiment, the housing 2 includes the first tabs 101 in contact with at least a part of the surface of the stator 24. The first tabs 101 and at least a part of each fuse terminal 64 are at the same position in the axial direction. This structure downsizes the stator 24 in the axial direction. This reduces the size of the motor 20 in the electric work machine 1.

The first tabs 101 and the fuse terminals 64 are at different positions in the circumferential direction. This structure avoids the first tabs 101 and the fuse terminals 64 being aligned in the axial direction. The stator 24 is thus downsized in the axial direction.

The surface of the stator 24 includes the axially-facing surfaces 120 facing in the axial direction. Each first tab 101 includes the first support surface 103 in contact with an axially-facing surface 120. The first support surfaces 103 and the axially-facing surface 120 in contact with each other position the housing 2 and the stator 24 in the axial direction.

The axially-facing surface 120 includes the end face 43A of the stator core 33 facing in the axial direction. The stator core 33 is formed from a metal. The first support surfaces 103 and the end face 43A of the stator core 33 in contact with each other position the housing 2 and the stator 24 in the axial direction.

The surface of the stator 24 includes the circumferentially-facing surfaces 130 facing in the circumferential direction. Each first tab 101 includes the contact surface 105 in contact with the corresponding circumferentially-facing surface 130. The contact surfaces 105 and the circumferentially-facing surfaces 130 in contact with each other position the housing 2 and the stator 24 in the circumferential direction.

The circumferentially-facing surfaces 130 include the first circumferentially-facing surfaces 131 facing in the first circumferential direction and the second circumferentially-facing surfaces 132 facing in the second circumferential direction. The multiple first tabs 101 are arranged about the rotation axis AX with each first tab 101 in contact with a first circumferentially-facing surface 131 or a second circumferentially-facing surface 132. In the embodiment, the circumferentially-facing surfaces 130 include two first circumferentially-facing surfaces 131 and two second circumferentially-facing surfaces 132. The first tab 101B and the first tab 101D are each in contact with either one of the two first circumferentially-facing surfaces 131. The first tab 101A and the first tab 101C are each in contact with either one of the two second circumferentially-facing surfaces 132. One or more of the first tabs 101 are in contact with the first circumferentially-facing surfaces 131 and the other first tabs 101 are in contact with the second circumferentially-facing surfaces 132. The housing 2 and the stator 24 are thus positioned in the first and second circumferential directions.

The insulator 34 includes the covers 49 covering at least a part of the end face 43A of the stator core 33 facing in the axial direction. The circumferentially-facing surfaces 130 include side surfaces of the covers 49. The circumferentially-facing surfaces 130 in the embodiment include side surfaces of the ribs 110 on the covers 49. The first circumferentially-facing surfaces 131 are each located on the rib 112 or on the rib 114. The second circumferentially-facing surfaces 132 are each located on the rib 111 or on the rib 113. When not being allowed to be on the stator core 33, the circumferentially-facing surfaces 130 may be located on the covers 49 in the insulator 34, which is molded integrally with the stator core 33. The housing 2 and the stator 24 are thus positioned in the circumferential direction.

The axially-facing surfaces 120 include the first axially-facing surface 121 facing in the first axial direction and the second axially-facing surface 122 facing in the second axial direction. Each first tab 101 has the first support surface 103 in contact with the first axially-facing surface 121. Each second tab 102 has the second support surface 104 in contact with the second axially-facing surface 122. The housing 2 and the stator 24 are thus positioned in the first and second axial directions.

The stator 24 is at least partially held between the first tabs 101 and the second tabs 102. The housing 2 thus holds the stator 24 stably. The stator 24 is at least partially held between the first tabs 101 and the second tabs 102 in the axial direction to avoid upsizing the stator 24 in the axial direction. This reduces the size of the motor 20 in the electric work machine 1.

The second tabs 102 and at least a part of each coil stopper 55 are at the same position in the axial direction. This structure downsizes the stator 24 in the axial direction. This reduces the size of the motor 20 in the electric work machine 1.

The second tabs 102 and at least a part of a coil stopper 55 are at the same position in the circumferential direction. The second tabs 102 in the embodiment are radially outward from the coil stoppers 55. Each second tab 102 and at least a part of a coil stopper 55 are at the same position in the circumferential direction to allow the second tabs 102 to stably hold the stator 24.

The first tabs 101 and at least a part of a second tab 102 are at the same position in the circumferential direction. The first tabs 101 and the second tabs 102 thus hold the stator 24 between them in the axial direction.

The multiple first tabs 101 are arranged about the rotation axis AX. The multiple second tabs 102 are arranged about the rotation axis AX. The first tabs 101 thus hold the stator 24 at multiple positions. Similarly, the second tabs 102 hold the stator 24 at multiple positions. The housing 2 and the stator 24 are thus stably fixed to each other.

The housing 2 includes the first half housing 95 and the second half housing 96 combined with the first half housing 95. A first group of the multiple first tabs 101 are located on the first half housing 95. A first group of the multiple second tabs 102 are located on the first half housing 95. A second group of the multiple first tabs 101 are located on the second half housing 96. A second group of the multiple second tabs 102 are located on the second half housing 96. The first tabs 101 and the second tabs 102 are distributed on both the first half housing 95 and the second half housing 96. This structure allows the multiple first tabs 101 and the multiple second tabs 102 to position the housing 2 and the stator 24 to fasten the first half housing 95 and the second half housing 96 together with the screws.

The stator core 33 and the insulator 34 are molded integrally with each other. In the embodiment, the metal stator core 33 is first placed in a mold, and then a resin for forming the insulator 34 is injected into the mold to integrally mold the stator core 33 and the insulator 34 by insert molding. The covers 50 in the insulator 34 are thus formed accurately using the mold. Thus, the second tabs 102 in contact with the covers 50 in the insulator 34 appropriately position the motor assembly 6 and the housing 2 relative to each other.

Other Embodiments

In the above embodiment, the first support surface 103 of each first tab 101 is in contact with the end face 43A of the stator core 33 as the first axially-facing surface 121. Each surface of the covers 49 in the insulator 34 covering at least a part of the end face 43A may serve as the first axially-facing surface 121.

In the above embodiment, the second support surface 104 of each second tab 102 is in contact with the surface of the corresponding cover 50 as the second axially-facing surface 122. The end face 44A of the stator core 33 facing rearward may serve as the second axially-facing surface 122.

In the above embodiment, the circumferentially-facing surfaces 130 are located on the covers 49, and each first tab 101 has the contact surface 105 in contact with a circumferentially-facing surface 130. The circumferentially-facing surfaces 130 may be located on the covers 50, and each second tab 102 may have the contact surface 105 in contact with a circumferentially-facing surface 130. Both the first tabs 101 and the second tabs 102 may each have the contact surface 105 in contact with a circumferentially-facing surface 130.

The electric work machine 1 in the above embodiment is a vibration driver drill, which is an example of a power tool. The power tool is not limited to a vibration driver drill, and may be, for example, a driver drill, an angle drill, an impact driver, a grinder, a hammer, a hammer drill, a circular saw, or a reciprocating saw. The electric work machine 1 may be outdoor power equipment. The outdoor power equipment may be, for example, a chain saw, a hedge trimmer, a lawn mower, a mowing machine, or a blower.

In the above embodiments, the electric work machine is powered by the battery pack 19 attached to the battery mount. In some embodiments, the electric work machine may use utility power (alternating-current power supply).

REFERENCE SIGNS LIST 1 electric work machine
2 housing 3 rear cover
4 gear case
5 battery mount
6 motor assembly
7 power transmission
8 spindle
8C chuck unit
9 controller
10 trigger switch
11 forward-reverse switch lever
12 speed switch lever
13 mode change ring
14 change ring
15 lamp
16 motor compartment
17 grip
18 controller compartment
19 battery pack
20 motor
21 fan
22 sensor unit
23 rotor
24 stator
25 inlet
26 outlet
27 rotor core
27F end face
27R end face
27S outer surface
28 rotor shaft
29 permanent magnet
30 magnet slot
31 resin
32 recess
33 stator core
34 insulator
35 coil
35E wind end portion
35M middle portion
35S wind start portion
35U U-phase coil
35V V-phase coil
35W W-phase coil
36 busbar unit
37 outer cylinder
38 tooth
39 inner wall
40 protrusion
41 inner surface
42 outer surface
43 end face
43A end face
43B end face
43C end face
44 end face
44A end face
44B end face
44C end face
45 opposing surface
46 opposing surface
47 side surface
48 side surface
49 cover
50 cover
51 cover
52 cover
53 coil stopper
54 coil stopper
55 coil stopper
56 wire support
57 screw boss
58 joint
59 protrusion
60 protrusion
61 screw hole
62 connection wire
63 external terminal
63U external terminal
63V external terminal
63W external terminal
64 fuse terminal (terminal)
64U fuse terminal
64V fuse terminal
64W fuse terminal
65 short-circuiting member
65U short-circuiting member
65V short-circuiting member
65W short-circuiting member
66 insulating member
67 base
68 first screw boss
69 second screw boss
70 positioning pin
71 positioning recess
72 joint
72R recess
73 screw hole
74 opening
75 support
76 sensor board
77 connector
78 rotation sensor
79 plate
82 insulating member
87 first screw
88 opening
89 positioning hole
92 second screw
93U power supply line
93V power supply line
93W power supply line
95 first half housing
96 second half housing
101 first tab
101A first tab
101B first tab
101C first tab
101D first tab
102 second tab
102A second tab
102B second tab
102C second tab
102D second tab
103 first support surface
104 second support surface
105 contact surface
110 rib
111 rib
112 rib
113 rib
114 rib
120 axially-facing surface
121 first axially-facing surface
122 second axially-facing surface 130 circumferentially-facing surface
131 first circumferentially-facing surface
132 second circumferentially-facing surface
141 support rib
142 support rib
143 support rib
144 support rib
491 cover area
492 cover area
493 cover area
494 cover area
495 cover area
501 cover area
502 cover area
503 cover area
504 cover area
505 cover area
506 cover area
620 wire
AX rotation axis

What is claimed is:

1. An electric work machine, comprising:
a motor including
a stator including
a stator core,
an insulator fixed to the stator core,
a plurality of coils fixed to the insulator, and
a terminal connected to at least one of the plurality of coils, and
a rotor rotatable about a rotation axis; and
a housing accommodating the motor, wherein:
the housing includes at least one first tab in contact with at least a part of a surface of the stator;
the at least one first tab being at the same position as at least a part of the terminal in an axial direction parallel to the rotation axis;
the surface of the stator includes an axially-facing surface facing in the axial direction; and
the at least one first tab has a first support surface in contact with the axially-facing surface.

2. The electric work machine according to claim 1, wherein
the at least one first tab and the terminal are at different positions in a circumferential direction about the rotation axis.

3. The electric work machine according to claim 1, wherein
the axially-facing surface includes an end face of the stator core facing in the axial direction.

4. The electric work machine according to claim 1, wherein
the insulator includes a cover covering at least a part of an end face of the stator core facing in the axial direction, and
the axially-facing surface includes a surface of the cover.

5. The electric work machine according to claim 1, wherein
the surface of the stator includes a circumferentially-facing surface facing in a circumferential direction about the rotation axis, and
the at least one first tab has a contact surface in contact with the circumferentially-facing surface.

6. The electric work machine according to claim 5, wherein
the circumferentially-facing surface includes
a first circumferentially-facing surface facing in a first circumferential direction, and
a second circumferentially-facing surface facing in a second circumferential direction,
the at least one first tab includes a plurality of first tabs spaced around the rotation axis, and
the plurality of first tabs are in contact with the first circumferentially-facing surface or the second circumferentially-facing surface.

7. The electric work machine according to claim 5, wherein
the insulator includes a cover covering at least a part of the end face of the stator core facing in the axial direction, and
the circumferentially-facing surface includes a side surface of the cover.

8. The electric work machine according to claim 1, wherein
the axially-facing surface includes
a first axially-facing surface facing in a first axial direction, and
a second axially-facing surface facing in a second axial direction, and
the first support surface of the at least one first tab is in contact with the first axially-facing surface.

9. The electric work machine according to claim 8, wherein
the housing includes a second tab at a position different from the at least one first tab in the axial direction, and the second tab is in contact with at least a part of the surface of the stator, and
the second tab has a second support surface in contact with the second axially-facing surface.

10. The electric work machine according to claim 9, wherein
the stator is at least partially between the at least one first tab and the second tab.

11. The electric work machine according to claim 9, wherein
the insulator includes a coil stopper radially outward from the plurality of coils,
the coil stopper protrudes in the axial direction from an end face of the stator core, and
the second tab and at least a part of the coil stopper are at the same position in the axial direction parallel to the rotation axis.

12. The electric work machine according to claim 11, wherein
the tab and at least a part of the coil stopper are at the same position in a circumferential direction about the rotation axis.

13. An electric work machine, comprising:
a motor including
a stator including
a stator core,
an insulator fixed to the stator core and including a coil stopper protruding in an axial direction from an end face of the stator core, and
a plurality of coils fixed to the insulator, and
a rotor rotatable about a rotation axis; and
a housing accommodating the motor, wherein:
the coil stopper is radially outward from the plurality of coils;
the housing includes a tab in contact with at least a part of a surface of the stator;
the tab being at the same position as at least a part of the coil stopper in the axial direction parallel to the rotation axis;

the surface of the stator includes an axially-facing surface facing in the axial direction; and the tab has a support surface in contact with the axially-facing surface.

14. An electric work machine, comprising:
a motor including
   a stator including
      a stator core,
      an insulator fixed to the stator core,
      a plurality of coils fixed to the insulator, and
      an axially-facing surface on a surface of the stator and facing in an axial direction, the axially-facing surface including
         a first axially-facing surface facing in a first axial direction, and
         a second axially-facing surface facing in a second axial direction, and
   a rotor rotatable about a rotation axis; and
a housing accommodating the motor, the housing including
   at least one first tab having a first support surface in contact with the first axially-facing surface, and
   at least one second tab at a position different from the at least one first tab in the axial direction parallel to the rotation axis, the at least one second tab having a second support surface in contact with the second axially-facing surface.

15. The electric work machine according to claim 14, wherein
the stator is at least partially held between the at least one first tab and the at least one second tab.

16. The electric work machine according to claim 14, wherein
the at least one first tab and at least a part of the at least one second tab are at the same position in a circumferential direction about the rotation axis.

17. The electric work machine according to claim 14, wherein
the at least one first tab includes a plurality of first tabs arranged about the rotation axis, and
the at least one second tab includes a plurality of second tabs arranged about the rotation axis.

18. The electric work machine according to claim 17, wherein
the housing includes
   a first half housing including a first group of the plurality of first tabs and a first group of the plurality of second tabs, and
   a second half housing combined with the first half housing and including a second group of the plurality of first tabs and a second group of the plurality of second tabs.

19. The electric work machine according to claim 14, wherein
the surface of the stator includes a circumferentially-facing surface facing in a circumferential direction about the rotation axis, and
at least one of the at least one first tab or the at least one second tab includes a contact surface in contact with the circumferentially-facing surface.

* * * * *